(12) United States Patent
Vaish et al.

(10) Patent No.: US 12,417,593 B2
(45) Date of Patent: Sep. 16, 2025

(54) GENERATING IMMERSIVE AUGMENTED REALITY EXPERIENCES FROM EXISTING IMAGES AND VIDEOS

(71) Applicant: Snap Inc., Santa Monica, CA (US)

(72) Inventors: Rajan Vaish, Beverly Hills, CA (US); Sven Kratz, Mercer Island, WA (US); Andrés Monroy-Hernández, Princeton, NJ (US); Brian Anthony Smith, New York, NY (US)

(73) Assignee: Snap Inc., Santa Monica, CA (US)

( * ) Notice: Subject to any disclaimer, the term of this patent is extended or adjusted under 35 U.S.C. 154(b) by 60 days.

(21) Appl. No.: 18/170,271

(22) Filed: Feb. 16, 2023

(65) Prior Publication Data

US 2024/0071008 A1 Feb. 29, 2024

Related U.S. Application Data

(60) Provisional application No. 63/402,914, filed on Aug. 31, 2022.

(51) Int. Cl.
| | |
|---|---|
| G06T 19/00 | (2011.01) |
| G06T 15/08 | (2011.01) |
| G06V 10/26 | (2022.01) |
| G06V 10/94 | (2022.01) |
| G06V 20/20 | (2022.01) |

(52) U.S. Cl.
CPC ............ *G06T 19/006* (2013.01); *G06T 15/08* (2013.01); *G06V 10/26* (2022.01); *G06V 10/945* (2022.01); *G06V 20/20* (2022.01); *G06T 2200/24* (2013.01); *G06V 2201/10* (2022.01)

(58) Field of Classification Search
None
See application file for complete search history.

(56) References Cited

U.S. PATENT DOCUMENTS

| | | | |
|---|---|---|---|
| 4,807,158 | A | 2/1989 | Blanton et al. |
| 6,038,295 | A | 3/2000 | Mattes |
| 6,430,997 | B1 | 8/2002 | French et al. |
| 6,819,982 | B2 | 11/2004 | Doane |
| 6,980,909 | B2 | 12/2005 | Root et al. |
| 7,173,651 | B1 | 2/2007 | Knowles |
| 7,190,496 | B2 | 3/2007 | Klug et al. |

(Continued)

FOREIGN PATENT DOCUMENTS

| | | |
|---|---|---|
| CA | 2887596 A1 | 7/2015 |
| CN | 105912129 A | 8/2016 |

(Continued)

OTHER PUBLICATIONS

US 10,656,660 B1, 05/2020, Meisenholder et al. (withdrawn)

(Continued)

*Primary Examiner* — David H Chu
(74) *Attorney, Agent, or Firm* — Schwegman Lundberg & Woessner, P.A.

(57) ABSTRACT

A two-dimensional element is identified from one or more two-dimensional images. A volumetric content item is generated based on the two-dimensional element identified from the one or more two-dimensional images. A display device presents the volumetric content item overlaid on a real-world environment that is within a field of view of a user of the display device.

20 Claims, 14 Drawing Sheets

(56) References Cited

U.S. PATENT DOCUMENTS

| | | | |
|---|---|---|---|
| 7,411,493 B2 | 8/2008 | Smith | |
| 7,535,890 B2 | 5/2009 | Rojas | |
| 7,542,073 B2 | 6/2009 | Li et al. | |
| 8,046,719 B2 | 10/2011 | Skourup et al. | |
| 8,131,597 B2 | 3/2012 | Hudetz | |
| 8,174,562 B2 | 5/2012 | Hartman | |
| 8,199,747 B2 | 6/2012 | Rojas et al. | |
| 8,274,550 B2 | 9/2012 | Steuart, III | |
| 8,332,475 B2 | 12/2012 | Rosen et al. | |
| 8,608,563 B2 | 12/2013 | Miyazaki et al. | |
| 8,646,720 B2 | 2/2014 | Shaw | |
| 8,718,333 B2 | 5/2014 | Wolf et al. | |
| 8,724,622 B2 | 5/2014 | Rojas | |
| 8,812,954 B2 | 8/2014 | Shuster et al. | |
| 8,874,677 B2 | 10/2014 | Rosen et al. | |
| 8,909,679 B2 | 12/2014 | Root et al. | |
| 8,934,015 B1 | 1/2015 | Chi et al. | |
| 8,995,433 B2 | 3/2015 | Rojas | |
| 9,040,574 B2 | 5/2015 | Wang et al. | |
| 9,055,416 B2 | 6/2015 | Rosen et al. | |
| 9,100,806 B2 | 8/2015 | Rosen et al. | |
| 9,100,807 B2 | 8/2015 | Rosen et al. | |
| 9,186,548 B2 | 11/2015 | House et al. | |
| 9,191,776 B2 | 11/2015 | Root et al. | |
| 9,204,252 B2 | 12/2015 | Root | |
| 9,235,932 B2 | 1/2016 | Choi et al. | |
| 9,344,642 B2 | 5/2016 | Niemi et al. | |
| 9,345,711 B2 | 5/2016 | Friedhoff | |
| 9,443,227 B2 | 9/2016 | Evans et al. | |
| 9,445,081 B1 | 9/2016 | Kouperman et al. | |
| 9,471,059 B1 | 10/2016 | Wilkins | |
| 9,489,661 B2 | 11/2016 | Evans et al. | |
| 9,489,937 B1 | 11/2016 | Beard et al. | |
| 9,491,134 B2 | 11/2016 | Rosen et al. | |
| 9,551,873 B2 | 1/2017 | Zalewski | |
| 9,576,369 B2 | 2/2017 | Venkataraman et al. | |
| 9,582,166 B2 | 2/2017 | Vaittinen et al. | |
| 9,586,147 B2 | 3/2017 | Bathiche et al. | |
| 9,589,448 B1 | 3/2017 | Schneider et al. | |
| 9,681,046 B2 | 6/2017 | Adsumilli et al. | |
| 9,703,369 B1 | 7/2017 | Mullen | |
| 9,723,272 B2 | 8/2017 | Lu et al. | |
| 9,747,901 B1 | 8/2017 | Gentry | |
| 9,761,057 B2 | 9/2017 | Salter et al. | |
| 9,779,538 B2 | 10/2017 | Sanders et al. | |
| 9,794,527 B1 | 10/2017 | Balez et al. | |
| 9,818,225 B2 | 11/2017 | Wang et al. | |
| 9,916,673 B2 | 3/2018 | Castro et al. | |
| 9,922,659 B2 | 3/2018 | Bradlow et al. | |
| 9,989,965 B2 | 6/2018 | Cuban et al. | |
| 10,061,328 B2 | 8/2018 | Canoy et al. | |
| 10,109,224 B1 | 10/2018 | Ratti et al. | |
| 10,140,987 B2 | 11/2018 | Erickson et al. | |
| 10,168,700 B2 | 1/2019 | Gordon et al. | |
| 10,282,903 B1 | 5/2019 | Clark et al. | |
| 10,289,193 B2 | 5/2019 | Hardy et al. | |
| 10,313,481 B2 | 6/2019 | Kada | |
| 10,325,410 B1 | 6/2019 | Smith et al. | |
| 10,365,784 B2 | 7/2019 | Inomata | |
| 10,370,118 B1 | 8/2019 | Nielsen et al. | |
| 10,403,050 B1 | 9/2019 | Beall et al. | |
| 10,445,925 B2 | 10/2019 | Tokubo | |
| 10,445,940 B2 | 10/2019 | Guay et al. | |
| 10,482,665 B2 | 11/2019 | Copic et al. | |
| 10,501,180 B2 | 12/2019 | Yu | |
| 10,504,277 B1 | 12/2019 | Haitani et al. | |
| 10,581,940 B1 | 3/2020 | Iyer et al. | |
| 10,599,286 B2 | 3/2020 | Inomata | |
| 10,616,663 B2 | 4/2020 | Davisson et al. | |
| 10,768,639 B1 | 9/2020 | Meisenholder et al. | |
| 10,768,776 B1 | 9/2020 | Roche et al. | |
| 10,796,489 B1 | 10/2020 | Cordes et al. | |
| 10,819,946 B1 | 10/2020 | Tanumihardja et al. | |
| 10,901,215 B1 | 1/2021 | Newcombe et al. | |
| 10,921,878 B2 | 2/2021 | Noris et al. | |
| 10,937,239 B2 | 3/2021 | Huston et al. | |
| 11,006,095 B2 | 5/2021 | Holzer et al. | |
| 11,051,049 B2 | 6/2021 | Bustamante et al. | |
| 11,062,517 B2 | 7/2021 | Crews et al. | |
| 11,094,127 B2 | 8/2021 | Mccall | |
| 11,126,206 B2 | 9/2021 | Meisenholder et al. | |
| 11,145,123 B1* | 10/2021 | Chor | G06F 3/147 |
| 11,156,830 B2 | 10/2021 | Johnson et al. | |
| 11,163,358 B2 | 11/2021 | Marks et al. | |
| 11,194,439 B2 | 12/2021 | Laaksonen et al. | |
| 11,200,028 B2 | 12/2021 | Newell et al. | |
| 11,200,742 B1 | 12/2021 | Post et al. | |
| 11,302,077 B2 | 4/2022 | Kang et al. | |
| 11,361,473 B1 | 6/2022 | Abdollahian et al. | |
| 11,372,474 B2 | 6/2022 | Schweet et al. | |
| 11,413,514 B2 | 8/2022 | Marty et al. | |
| 11,436,806 B1 | 9/2022 | Katz | |
| 11,468,605 B2 | 10/2022 | Corson | |
| 11,481,423 B1 | 10/2022 | Singleton | |
| 11,481,980 B2 | 10/2022 | Yerli | |
| 11,495,004 B1 | 11/2022 | Henry | |
| 11,521,359 B2 | 12/2022 | Noorkami et al. | |
| 11,623,138 B2 | 4/2023 | Yeh et al. | |
| 11,734,905 B1 | 8/2023 | Henry | |
| 11,769,299 B1 | 9/2023 | Stehlik et al. | |
| 11,810,259 B2 | 11/2023 | Ramani et al. | |
| 11,847,749 B2 | 12/2023 | Lebeaupin et al. | |
| 11,941,764 B2 | 3/2024 | Harding et al. | |
| 11,972,521 B2 | 4/2024 | Vaish et al. | |
| 12,267,482 B2 | 4/2025 | Vaish et al. | |
| 2004/0135890 A1 | 7/2004 | Kaneko et al. | |
| 2006/0287025 A1 | 12/2006 | French | |
| 2007/0167689 A1 | 7/2007 | Ramadas et al. | |
| 2007/0250526 A1 | 10/2007 | Hanna | |
| 2008/0081676 A1 | 4/2008 | Chakraborty et al. | |
| 2008/0158256 A1 | 7/2008 | Russell et al. | |
| 2008/0168411 A1 | 7/2008 | Mang et al. | |
| 2008/0186255 A1 | 8/2008 | Cohen et al. | |
| 2008/0211771 A1 | 9/2008 | Richardson | |
| 2008/0255842 A1 | 10/2008 | Simhi | |
| 2009/0122133 A1 | 5/2009 | Hartman | |
| 2009/0171902 A1 | 7/2009 | Maclaurin et al. | |
| 2009/0187389 A1 | 7/2009 | Dobbins et al. | |
| 2009/0213114 A1 | 8/2009 | Dobbins et al. | |
| 2010/0026809 A1 | 2/2010 | Curry | |
| 2010/0125799 A1 | 5/2010 | Roberts et al. | |
| 2010/0185984 A1 | 7/2010 | Wright et al. | |
| 2010/0260422 A1 | 10/2010 | Ito et al. | |
| 2011/0179313 A1 | 7/2011 | Macdonald et al. | |
| 2011/0202598 A1 | 8/2011 | Evans et al. | |
| 2011/0214082 A1 | 9/2011 | Osterhout et al. | |
| 2011/0242134 A1 | 10/2011 | Miller et al. | |
| 2011/0261083 A1 | 10/2011 | Wilson | |
| 2012/0052947 A1 | 3/2012 | Yun | |
| 2012/0131125 A1 | 5/2012 | Seidel et al. | |
| 2012/0188452 A1 | 7/2012 | Keiser et al. | |
| 2012/0194420 A1 | 8/2012 | Osterhout et al. | |
| 2012/0209924 A1 | 8/2012 | Evans et al. | |
| 2012/0263154 A1 | 10/2012 | Blanchflower et al. | |
| 2012/0281885 A1 | 11/2012 | Syrdal et al. | |
| 2012/0287274 A1 | 11/2012 | Bevirt | |
| 2012/0320169 A1 | 12/2012 | Bathiche | |
| 2013/0056581 A1 | 3/2013 | Sparks | |
| 2013/0072296 A1 | 3/2013 | Miyazaki et al. | |
| 2013/0083009 A1 | 4/2013 | Geisner et al. | |
| 2013/0083173 A1 | 4/2013 | Geisner et al. | |
| 2013/0162632 A1 | 6/2013 | Varga et al. | |
| 2013/0238168 A1 | 9/2013 | Reyes | |
| 2014/0013228 A1 | 1/2014 | Hutten | |
| 2014/0038708 A1 | 2/2014 | Davison et al. | |
| 2014/0254896 A1 | 9/2014 | Zhou et al. | |
| 2014/0285522 A1* | 9/2014 | Kim | G06Q 30/0601 |
| | | | 345/633 |
| 2014/0357366 A1 | 12/2014 | Koganezawa et al. | |
| 2014/0368542 A1* | 12/2014 | Tawara | G06T 19/006 |
| | | | 345/633 |
| 2015/0015486 A1 | 1/2015 | Osman et al. | |
| 2015/0015608 A1* | 1/2015 | Park | G06F 3/012 |
| | | | 345/633 |

(56) References Cited

U.S. PATENT DOCUMENTS

| | | |
|---|---|---|
| 2015/0016777 A1 | 1/2015 | Abovitz et al. |
| 2015/0022432 A1 | 1/2015 | Stewart et al. |
| 2015/0035862 A1 | 2/2015 | Fischer et al. |
| 2015/0070272 A1 | 3/2015 | Kim et al. |
| 2015/0175263 A1 | 6/2015 | Reyes |
| 2015/0193979 A1 | 7/2015 | Grek |
| 2015/0199022 A1 | 7/2015 | Gottesman et al. |
| 2015/0287246 A1 | 10/2015 | Huston et al. |
| 2015/0331490 A1 | 11/2015 | Yamada |
| 2015/0355711 A1 | 12/2015 | Rihn |
| 2015/0362917 A1 | 12/2015 | Wang et al. |
| 2015/0363034 A1 | 12/2015 | Hinckley et al. |
| 2016/0004390 A1 | 1/2016 | Laska et al. |
| 2016/0027218 A1 | 1/2016 | Salter et al. |
| 2016/0049003 A1 | 2/2016 | Shuster et al. |
| 2016/0063987 A1 | 3/2016 | Xu et al. |
| 2016/0071548 A1 | 3/2016 | House et al. |
| 2016/0133230 A1 | 5/2016 | Daniels et al. |
| 2016/0161946 A1 | 6/2016 | Wuth Sepulveda et al. |
| 2016/0179096 A1 | 6/2016 | Bradlow et al. |
| 2016/0217623 A1* | 7/2016 | Singh .................. G09G 5/00 |
| 2016/0292575 A1 | 10/2016 | Weast et al. |
| 2016/0292886 A1 | 10/2016 | Erad et al. |
| 2016/0307335 A1 | 10/2016 | Perry et al. |
| 2016/0307573 A1 | 10/2016 | Wobrock |
| 2016/0330532 A1 | 11/2016 | Bostick et al. |
| 2016/0336020 A1 | 11/2016 | Bradlow et al. |
| 2016/0350973 A1 | 12/2016 | Shapira et al. |
| 2016/0357258 A1 | 12/2016 | Yeom et al. |
| 2017/0031369 A1 | 2/2017 | Liu et al. |
| 2017/0061700 A1 | 3/2017 | Urbach et al. |
| 2017/0084051 A1 | 3/2017 | Weising et al. |
| 2017/0094259 A1 | 3/2017 | Kouperman et al. |
| 2017/0099424 A1 | 4/2017 | Jones |
| 2017/0102699 A1 | 4/2017 | Anderson |
| 2017/0177925 A1 | 6/2017 | Volkart |
| 2017/0208103 A1 | 7/2017 | Sarmova |
| 2017/0225796 A1 | 8/2017 | Sun et al. |
| 2017/0228690 A1 | 8/2017 | Kohli |
| 2017/0237940 A1 | 8/2017 | Chaney et al. |
| 2017/0244937 A1 | 8/2017 | Meier et al. |
| 2017/0256040 A1 | 9/2017 | Grauer |
| 2017/0266554 A1 | 9/2017 | Marks et al. |
| 2017/0269685 A1 | 9/2017 | Marks et al. |
| 2017/0320564 A1 | 11/2017 | Kuzikov |
| 2017/0323481 A1 | 11/2017 | Tran et al. |
| 2017/0324841 A1 | 11/2017 | Clement et al. |
| 2017/0337791 A1 | 11/2017 | Gordon-carroll |
| 2017/0359624 A1 | 12/2017 | Englert et al. |
| 2017/0364153 A1 | 12/2017 | Kazansky et al. |
| 2017/0365098 A1 | 12/2017 | Auten et al. |
| 2017/0365102 A1 | 12/2017 | Huston et al. |
| 2017/0371353 A1 | 12/2017 | Millinger, III |
| 2018/0005429 A1 | 1/2018 | Osman et al. |
| 2018/0059783 A1 | 3/2018 | Van Hoff et al. |
| 2018/0082682 A1 | 3/2018 | Erickson et al. |
| 2018/0098059 A1 | 4/2018 | Valdivia et al. |
| 2018/0130257 A1 | 5/2018 | Moran |
| 2018/0154232 A1 | 6/2018 | Gentil |
| 2018/0190033 A1* | 7/2018 | Barnett .................. G06N 20/00 |
| 2018/0246529 A1 | 8/2018 | Hu et al. |
| 2018/0270427 A1 | 9/2018 | Damstra et al. |
| 2018/0288364 A1 | 10/2018 | Virhia |
| 2018/0311585 A1 | 11/2018 | Osman |
| 2018/0329486 A1 | 11/2018 | Williams et al. |
| 2019/0005546 A1* | 1/2019 | Chen .................. G06Q 30/0267 |
| 2019/0005728 A1 | 1/2019 | Leppanen et al. |
| 2019/0011921 A1 | 1/2019 | Wang et al. |
| 2019/0054379 A1 | 2/2019 | Ackley et al. |
| 2019/0073831 A1 | 3/2019 | Kim |
| 2019/0073832 A1 | 3/2019 | Kim |
| 2019/0130599 A1 | 5/2019 | Gebbie et al. |
| 2019/0130631 A1 | 5/2019 | Gebbie et al. |
| 2019/0138260 A1 | 5/2019 | Rogers et al. |
| 2019/0138463 A1 | 5/2019 | Kurata et al. |
| 2019/0172265 A1 | 6/2019 | Cossairt et al. |
| 2019/0180509 A1 | 6/2019 | Laaksonen et al. |
| 2019/0182471 A1 | 6/2019 | Khalid et al. |
| 2019/0188895 A1 | 6/2019 | Miller, IV et al. |
| 2019/0199993 A1 | 6/2019 | Babu J D et al. |
| 2019/0208189 A1 | 7/2019 | Lau et al. |
| 2019/0217189 A1 | 7/2019 | Gutierrez et al. |
| 2019/0278369 A1 | 9/2019 | Ballard |
| 2019/0325654 A1 | 10/2019 | Stisser et al. |
| 2019/0358547 A1 | 11/2019 | Mack et al. |
| 2020/0020136 A1* | 1/2020 | Hwang .................. G06F 3/013 |
| 2020/0042160 A1 | 2/2020 | Gabbi et al. |
| 2020/0043235 A1 | 2/2020 | Chapman et al. |
| 2020/0051336 A1 | 2/2020 | Ichikawa et al. |
| 2020/0066043 A1 | 2/2020 | Graham et al. |
| 2020/0097077 A1 | 3/2020 | Nguyen et al. |
| 2020/0098179 A1 | 3/2020 | Gough et al. |
| 2020/0098191 A1 | 3/2020 | Mccall |
| 2020/0101372 A1 | 4/2020 | Drake et al. |
| 2020/0126257 A1 | 4/2020 | Tauber |
| 2020/0134911 A1 | 4/2020 | Van Hoff et al. |
| 2020/0159361 A1 | 5/2020 | Rosenberg et al. |
| 2020/0162779 A1 | 5/2020 | Saxena |
| 2020/0169715 A1 | 5/2020 | Liu et al. |
| 2020/0171394 A1 | 6/2020 | Khan et al. |
| 2020/0241575 A1 | 7/2020 | Meisenholder et al. |
| 2020/0242840 A1 | 7/2020 | Logan et al. |
| 2020/0257367 A1 | 8/2020 | Rihn et al. |
| 2020/0260149 A1 | 8/2020 | Ding et al. |
| 2020/0273243 A1 | 8/2020 | Duffy et al. |
| 2020/0279407 A1 | 9/2020 | Liljeroos et al. |
| 2020/0289935 A1 | 9/2020 | Azmandian et al. |
| 2020/0289941 A1 | 9/2020 | Khan et al. |
| 2020/0314323 A1 | 10/2020 | Van Geel et al. |
| 2020/0341541 A1 | 10/2020 | Olah-Reiken et al. |
| 2020/0349751 A1 | 11/2020 | Bentovim et al. |
| 2020/0371737 A1 | 11/2020 | Leppänen et al. |
| 2020/0394012 A1 | 12/2020 | Wright, Jr. et al. |
| 2020/0409451 A1 | 12/2020 | Mukherjea et al. |
| 2021/0096543 A1 | 4/2021 | Stump et al. |
| 2021/0142578 A1 | 5/2021 | Weinheimer et al. |
| 2021/0159980 A1 | 5/2021 | Ben-Yehuda et al. |
| 2021/0232632 A1 | 7/2021 | Howard |
| 2021/0272367 A1 | 9/2021 | Richter |
| 2021/0279962 A1 | 9/2021 | Hutten et al. |
| 2021/0286179 A1 | 9/2021 | Miller, IV et al. |
| 2021/0287452 A1 | 9/2021 | Maruyama |
| 2021/0289317 A1 | 9/2021 | Son et al. |
| 2021/0312684 A1 | 10/2021 | Zimmermann et al. |
| 2021/0327145 A1 | 10/2021 | Noorkami et al. |
| 2021/0362848 A1 | 11/2021 | Spencer |
| 2021/0374579 A1 | 12/2021 | Dotan-cohen et al. |
| 2021/0382503 A1 | 12/2021 | Meisenholder et al. |
| 2021/0390953 A1 | 12/2021 | Makker et al. |
| 2021/0394046 A1 | 12/2021 | Yen et al. |
| 2021/0405772 A1 | 12/2021 | Canberk et al. |
| 2021/0407178 A1 | 12/2021 | Zhou et al. |
| 2021/0407208 A1 | 12/2021 | Hariton |
| 2021/0409502 A1 | 12/2021 | Chepizhenko et al. |
| 2022/0014723 A1 | 1/2022 | Pandey et al. |
| 2022/0028108 A1 | 1/2022 | Haapoja et al. |
| 2022/0028170 A1 | 1/2022 | Haapoja et al. |
| 2022/0053219 A1 | 2/2022 | Bathory |
| 2022/0101593 A1 | 3/2022 | Rockel et al. |
| 2022/0103969 A1 | 3/2022 | Drummond et al. |
| 2022/0108539 A1 | 4/2022 | Nussbaum et al. |
| 2022/0116581 A1 | 4/2022 | Miyata et al. |
| 2022/0124143 A1 | 4/2022 | Rafkind et al. |
| 2022/0139055 A1 | 5/2022 | Palmaro |
| 2022/0146833 A1 | 5/2022 | Miller, IV et al. |
| 2022/0164491 A1 | 5/2022 | Palmaro |
| 2022/0189075 A1 | 6/2022 | Lynch et al. |
| 2022/0197485 A1 | 6/2022 | Goodrich et al. |
| 2022/0198603 A1 | 6/2022 | Goodrich et al. |
| 2022/0230663 A1 | 7/2022 | Sun et al. |
| 2022/0242450 A1 | 8/2022 | Sokolov et al. |
| 2022/0244835 A1 | 8/2022 | Faulkner et al. |
| 2022/0247929 A1 | 8/2022 | Yang et al. |
| 2022/0269336 A1 | 8/2022 | Lafontaine et al. |

(56) References Cited

U.S. PATENT DOCUMENTS

| | | | |
|---|---|---|---|
| 2022/0274026 A1 | 9/2022 | Steigelfest et al. | |
| 2022/0362631 A1 | 11/2022 | Hong | |
| 2022/0382255 A1* | 12/2022 | Lee | H04L 67/125 |
| 2023/0010754 A1 | 1/2023 | Saxena | |
| 2023/0063505 A1 | 3/2023 | Chastain et al. | |
| 2023/0097571 A1 | 3/2023 | Mccain et al. | |
| 2023/0139337 A1 | 5/2023 | Noam et al. | |
| 2023/0173367 A1 | 6/2023 | Marty et al. | |
| 2023/0179641 A1 | 6/2023 | Bauer et al. | |
| 2023/0214005 A1 | 7/2023 | Ohashi | |
| 2023/0214082 A1* | 7/2023 | Kang | G06F 3/012 345/633 |
| 2023/0237192 A1 | 7/2023 | Kahan et al. | |
| 2023/0316681 A1 | 10/2023 | Dolev et al. | |
| 2023/0334754 A1 | 10/2023 | Kirchmayer et al. | |
| 2023/0341928 A1 | 10/2023 | Traynor et al. | |
| 2023/0342989 A1 | 10/2023 | Lehtiniemi et al. | |
| 2023/0409114 A1 | 12/2023 | Sun et al. | |
| 2023/0412480 A1 | 12/2023 | Greyson et al. | |
| 2024/0005623 A1 | 1/2024 | Cooper et al. | |
| 2024/0069626 A1 | 2/2024 | Vaish et al. | |
| 2024/0069627 A1 | 2/2024 | Vaish et al. | |
| 2024/0069637 A1 | 2/2024 | Vaish et al. | |
| 2024/0070969 A1 | 2/2024 | Vaish et al. | |
| 2024/0071004 A1 | 2/2024 | Vaish et al. | |
| 2024/0071006 A1 | 2/2024 | Kratz et al. | |
| 2024/0071007 A1 | 2/2024 | Vaish et al. | |
| 2024/0073402 A1 | 2/2024 | Vaish et al. | |
| 2024/0073404 A1 | 2/2024 | Vaish et al. | |
| 2024/0119679 A1 | 4/2024 | Canberk et al. | |
| 2024/0119682 A1 | 4/2024 | Rudman et al. | |
| 2024/0233224 A1 | 7/2024 | Fan et al. | |
| 2024/0273832 A1 | 8/2024 | Newman et al. | |

FOREIGN PATENT DOCUMENTS

| | | |
|---|---|---|
| JP | 2010061452 A | 3/2010 |
| KR | 20200014587 A | 2/2020 |
| KR | 20200109812 A | 9/2020 |
| KR | 20210065423 | 6/2021 |
| KR | 20210135859 A | 11/2021 |
| KR | 20220064130 | 5/2022 |
| WO | WO-2016105839 A1 | 6/2016 |
| WO | WO-2021002788 A1 | 1/2021 |
| WO | 2024049687 | 3/2024 |
| WO | WO-2024049700 A1 | 3/2024 |
| WO | WO-2024050229 A1 | 3/2024 |
| WO | WO-2024050231 A1 | 3/2024 |
| WO | WO-2024050232 A1 | 3/2024 |
| WO | WO-2024050245 A1 | 3/2024 |
| WO | WO-2024050246 A1 | 3/2024 |
| WO | WO-2024050259 A1 | 3/2024 |
| WO | WO-2024050262 A1 | 3/2024 |
| WO | WO-2024050264 A1 | 3/2024 |

OTHER PUBLICATIONS

"International Application Serial No. PCT US2023 030926, International Search Report mailed Dec. 12, 2023", 3 pgs.

"International Application Serial No. PCT US2023 030926, Written Opinion mailed Dec. 12, 2023", 4 pgs.

Laput, Gierad, et al., "PixelTone: A Multimodal Interface for Image Editing", ACM, Proceedings of the SIGCHI Conference on Human Factors in Computing Systems, Paris, FR, (2013), 10 pgs.

Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.

Meisenholder, David, et al., "Remoteless Control of Drone Behavior", U.S. Appl. No. 15/640,143, filed Jun. 30, 2017, 108 pgs.

Pourmehr, Shokoofeh, et al., "'You two! Take off!': Creating, Modifying, and Commanding Groups of Robots Using Face Engagement and Indirect Speech in Voice Commands", IEEE/RSJ International Conference on Intelligent Robots and Systems (IROS), Tokyo, JP, (2013), 137-142.

Yamada, Wataru, et al., "iSphere: Self-Luminous Spherical Drone Display", Proceedings of the 30th Annual ACM Symposium on User Interface Software and Technology (UIST), Quebec City, CA, (Oct. 22-25, 2017), 635-343.

"U.S. Appl. No. 17/899,935, Non Final Office Action mailed Jun. 6, 2024", 13 pgs.

"U.S. Appl. No. 17/899,935, Response filed Oct. 7, 2024 to Non Final Office Action mailed Jun. 6, 2024", 11 pgs.

"U.S. Appl. No. 17/899,970, Corrected Notice of Allowability mailed Jan. 3, 2024", 5 pgs.

"U.S. Appl. No. 17/899,970, Non Final Office Action mailed Jul. 3, 2023", 22 pgs.

"U.S. Appl. No. 17/899,970, Notice of Allowance mailed Dec. 20, 2023", 9 pgs.

"U.S. Appl. No. 17/899,970, PTO Response to Rule 312 Communication mailed Mar. 27, 2024", 1 page.

"U.S. Appl. No. 17/899,970, Response filed Oct. 3, 2023 to Non Final Office Action mailed Jul. 3, 2023", 11 pgs.

"U.S. Appl. No. 17/899,970, Supplemental Notice of Allowability mailed Mar. 27, 2024", 2 pgs.

"U.S. Appl. No. 17/900,200, Final Office Action mailed May 6, 2024", 32 pgs.

"U.S. Appl. No. 17/900,200, Non Final Office Action mailed Aug. 29, 2024", 35 pgs.

"U.S. Appl. No. 17/900,200, Non Final Office Action mailed Nov. 8, 2023", 26 pgs.

"U.S. Appl. No. 17/900,200, Response filed Jan. 31, 2024 to Non Final Office Action mailed Nov. 8, 2023", 14 pgs.

"U.S. Appl. No. 17/900,200, Response filed Aug. 6, 2024 to Final Office Action mailed May 6, 2024", 13 pgs.

"U.S. Appl. No. 17/900,407, Advisory Action mailed Oct. 30, 2024", 3 pgs.

"U.S. Appl. No. 17/900,407, Examiner Interview Summary mailed Apr. 15, 2024", 2 pgs.

"U.S. Appl. No. 17/900,407, Final Office Action mailed Aug. 21, 2024", 14 pgs.

"U.S. Appl. No. 17/900,407, Non Final Office Action mailed Feb. 9, 2024", 11 pgs.

"U.S. Appl. No. 17/900,407, Response filed Apr. 23, 2024 to Non Final Office Action mailed Feb. 9, 2024", 12 pgs.

"U.S. Appl. No. 17/900,407, Response filed Oct. 18, 2024 to Final Office Action mailed Aug. 21, 2024", 12 pgs.

"U.S. Appl. No. 17/900,436, Non Final Office Action mailed Sep. 23, 2024", 12 pgs.

"U.S. Appl. No. 18/056,142, Corrected Notice of Allowability mailed Sep. 4, 2024", 2 pgs.

"U.S. Appl. No. 18/056,142, Examiner Interview Summary mailed Nov. 7, 2023", 2 pgs.

"U.S. Appl. No. 18/056,142, Final Office Action mailed Apr. 8, 2024", 15 pgs.

"U.S. Appl. No. 18/056,142, Non Final Office Action mailed Aug. 7, 2023", 12 pgs.

"U.S. Appl. No. 18/056,142, Notice of Allowance mailed Aug. 16, 2024", 9 pgs.

"U.S. Appl. No. 18/056,142, Notice of Non-Compliant Amendment mailed Nov. 16, 2023", 2 pgs.

"U.S. Appl. No. 18/056,142, Response filed Jan. 3, 2024 to Notice of Non-Compliant Amendment mailed Nov. 16, 2023", 11 pgs.

"U.S. Appl. No. 18/056,142, Response filed Jul. 8, 2024 to Final Office Action mailed Apr. 8, 2024", 13 pgs.

"U.S. Appl. No. 18/056,142, Response filed Nov. 7, 2023 to Non Final Office Action mailed Aug. 7, 2023", 11 pgs.

"U.S. Appl. No. 18/058,175, Examiner Interview Summary mailed Jun. 7, 2024", 2 pgs.

"U.S. Appl. No. 18/058,175, Final Office Action mailed Sep. 19, 2024", 12 pgs.

"U.S. Appl. No. 18/058,175, Non Final Office Action mailed Mar. 11, 2024", 14 pgs.

"U.S. Appl. No. 18/058,175, Response filed Jun. 11, 2024 to Non Final Office Action mailed Mar. 11, 2024", 11 pgs.

(56) References Cited

OTHER PUBLICATIONS

"U.S. Appl. No. 18/058,175, Response filed Oct. 30, 2024 to Final Office Action mailed Sep. 19, 2024", 9 pgs.
"U.S. Appl. No. 18/169,631, Non Final Office Action mailed Sep. 17, 2024", 28 pgs.
"U.S. Appl. No. 17/899,970, 312 Amendment filed Mar. 20, 2024", 7 pgs.
"International Application Serial No. PCT/US2023/031066, International Search Report mailed Dec. 15, 2023", 3 pgs.
"International Application Serial No. PCT/US2023/031066, Written Opinion mailed Dec. 15, 2023", 3 pgs.
"International Application Serial No. PCT/US2023/072274, International Search Report mailed Nov. 28, 2023", 3 pgs.
"International Application Serial No. PCT/US2023/072274, Written Opinion mailed Nov. 28, 2023", 4 pgs.
"International Application Serial No. PCT/US2023/072277, International Search Report mailed Dec. 8, 2023", 4 pgs.
"International Application Serial No. PCT/US2023/072277, Written Opinion mailed Dec. 8, 2023", 4 pgs.
"International Application Serial No. PCT/US2023/072282, International Search Report mailed Dec. 1, 2023", 4 pgs.
"International Application Serial No. PCT/US2023/072282, Written Opinion mailed Dec. 1, 2023", 4 pgs.
"International Application Serial No. PCT/US2023/072557, International Search Report mailed Dec. 12, 2023", 3 pgs.
"International Application Serial No. PCT/US2023/072557, Written Opinion mailed Dec. 12, 2023", 4 pgs.
"International Application Serial No. PCT/US2023/072568, International Search Report mailed Dec. 5, 2023", 3 pgs.
"International Application Serial No. PCT/US2023/072568, Written Opinion mailed Dec. 5, 2023", 4 pgs.
"International Application Serial No. PCT/US2023/072701, International Search Report mailed Dec. 1, 2023", 3 pgs.
"International Application Serial No. PCT/US2023/072701, Written Opinion mailed Dec. 1, 2023", 4 pgs.
"International Application Serial No. PCT/US2023/072718, International Search Report mailed Dec. 1, 2023", 3 pgs.
"International Application Serial No. PCT/US2023/072718, Written Opinion mailed Dec. 1, 2023", 4 pgs.
"International Application Serial No. PCT/US2023/072726, International Search Report mailed Dec. 12, 2023", 3 pgs.
"International Application Serial No. PCT/US2023/072726, Written Opinion mailed Dec. 12, 2023", 4 pgs.
Ko, Jonggook, et al., "Hybrid Camera Based Real-Time Human Body Segmentation for Virtual Reality E-learning System", First ACIS JNU International Conference on Computers Networks Systems and Industrial Engineering Jeju Korea South, (2011), 3 pgs.
Langa, Sergi Fernandez, et al., "Multiparty Holomeetings Toward a New Era of Low Cost Volumetric Holographic Meetings in Virtual Reality", IEEE Access vol. 10, (Aug. 3, 2022), 21 pgs.
S. A., Aseeri, et al., "The Influence of Avatar Representation and Behavior on Communication in Social Immersive Virtual Environments", IEEE Conference on Virtual Reality and 3D User Interfaces VR Tuebingen Reutlingen Germany, (2018), 2 pgs.
Yanbin, Wang, et al., "Real Time Stereoscopic Rendering of Realistic Avatar for Interactive 3D Telepresence System", 2nd International Conference on Image Vision and Computing ICIVC Chengdu, (2017), 5 pgs.
"U.S. Appl. No. 17/900,200, Response filed Nov. 27, 2024 to Non Final Office Action mailed Aug. 29, 2024", 13 pgs.
"U.S. Appl. No. 17/900,354, Non Final Office Action mailed Dec. 12, 2024", 17 pgs.
"U.S. Appl. No. 17/900,407, Notice of Allowance mailed Nov. 27, 2024", 8 pgs.
"U.S. Appl. No. 17/900,436, Examiner Interview Summary mailed Jan. 3, 2025", 2 pgs.
"U.S. Appl. No. 17/900,436, Response filed Dec. 20, 2024 to Non Final Office Action mailed Sep. 23, 2024", 12 pgs.
"U.S. Appl. No. 18/056,142, Notice of Allowability mailed Dec. 31, 2024", 2 pgs.
"U.S. Appl. No. 18/056,142, Notice of Allowance mailed Dec. 11, 2024", 5 pgs.
"U.S. Appl. No. 18/058,175, Notice of Allowance mailed Nov. 15, 2024", 8 pgs.
"U.S. Appl. No. 18/169,631, Response filed Dec. 17, 2024 to Non Final Office Action mailed Sep. 17, 2024", 11 pgs.
"U.S. Appl. No. 17/899,935, Non Final Office Action mailed Apr. 17, 2025", 14 pgs.
"U.S. Appl. No. 17/899,935, Response filed Apr. 9, 2025 to Final Office Action mailed Jan. 10, 2025", 10 pgs.
"U.S. Appl. No. 17/900,200, Final Office Action mailed Mar. 3, 2025", 39 pgs.
"U.S. Appl. No. 17/900,354, Response filed Mar. 12, 2025 to Non Final Office Action mailed Dec. 12, 2024", 10 pgs.
"U.S. Appl. No. 17/900,436, Final Office Action mailed Apr. 10, 2025", 14 pgs.
"U.S. Appl. No. 18/056,142, Corrected Notice of Allowability mailed Mar. 12, 2025", 2 pgs.
"U.S. Appl. No. 18/056,142, Corrected Notice of Allowability mailed Mar. 26, 2025", 2 pgs.
"U.S. Appl. No. 18/169,631, Final Office Action mailed Mar. 10, 2025", 28 pgs.
"International Application Serial No. PCT/US2023/030926, International Preliminary Report on Patentability mailed Mar. 13, 2025", 6 pgs.
"U.S. Appl. No. 17/899,935, Response filed Jul. 16, 2025 to Non Final Office Action mailed Apr. 17, 2025", 13 pgs.
"U.S. Appl. No. 17/900,200, Response filed Jul. 30, 2025 to Final Office Action mailed Mar. 3, 2025", 13 pgs.
"U.S. Appl. No. 17/900,436, Examiner Interview Summary mailed Jul. 16, 2025", 2 pgs.
"U.S. Appl. No. 17/900,436, Non Final Office Action mailed Jul. 29, 2025", 13 pgs.
"U.S. Appl. No. 18/169,631, Non Final Office Action mailed Jul. 15, 2025", 18 pgs.

* cited by examiner

GENERATING IMMERSIVE AUGMENTED REALITY EXPERIENCES FROM EXISTING IMAGES AND VIDEOS

CROSS-REFERENCE TO RELATED APPLICATION

This patent application claims the benefit of U.S. Provisional Patent Application No. 63/402,914, filed Aug. 31, 2022, entitled "GENERATING IMMERSIVE AUGMENTED REALITY EXPERIENCES FROM EXISTING IMAGES AND VIDEOS", which is incorporated by reference herein in its entirety.

TECHNICAL FIELD

The present disclosure generally relates to mobile and wearable computing technology. In particular, example embodiments of the present disclosure address systems, methods, and user interfaces for creating immersive augmented reality experiences from existing images and videos.

BACKGROUND

An augmented reality (AR) experience includes application of virtual content to a real-world environment whether through presentation of the virtual content by transparent displays through which a real-world environment is visible or through augmenting image data to include the virtual content overlaid on real-world environments depicted therein. The virtual content can comprise one or more AR content items. An AR content item may include audio content, visual content or a visual effect. Examples of audio and visual content include pictures, texts, logos, animations, and sound effects. A device that supports AR experiences in any one of these approaches is referred to herein as an "AR device."

For some example AR devices, audio and visual content or the visual effects are applied to media data such as a live image stream. Other example AR devices include head-worn devices that may be implemented with a transparent or semi-transparent display through which a user of the head-worn device can view the surrounding environment. Such devices enable a user to see through the transparent or semi-transparent display to view the surrounding environment, and to also see objects (e.g., virtual objects such as 3D renderings, images, video, text, and so forth) that are generated for display to appear as a part of, and/or overlaid upon, the surrounding environment. A user of the head-worn device may access and use a computer software application to perform various tasks or engage in an entertaining activity. To use the computer software application, the user interacts with a 3D user interface provided by the head-worn device.

The so-called "Internet of Things" or "IoT" is a network of physical objects (referred to as "smart devices" or "IoT devices") that are embedded with sensors, software, and other technologies for enabling connection and exchange of data with other devices via the Internet. For example, IoT devices are used in home automation to control lighting, heating and air conditioning, media and security systems, and camera systems. A number of IoT-enabled devices have been provided that function as smart home hubs to connect different smart home products. IoT devices have been used in a number of other applications as well. Application layer protocols and supporting frameworks have been provided for implementing such IoT applications. Artificial intelligence has also been combined with the IoT infrastructure to achieve more efficient IoT operations, improve human-machine interactions, and enhance data management and analytics.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
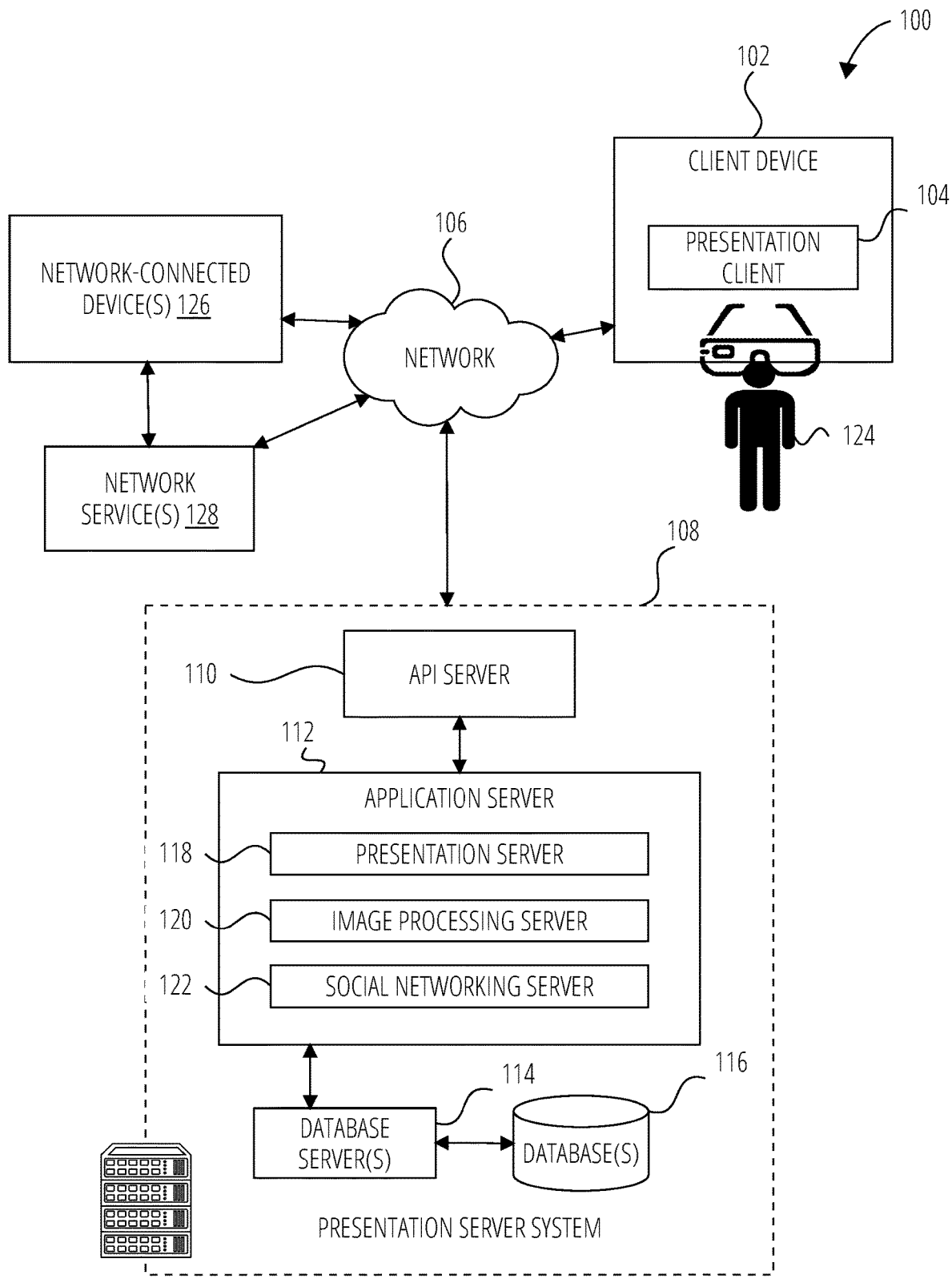
FIG. 1 is a diagrammatic representation of a networked environment in which a volumetric content presentation system may be deployed, in accordance with some example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Volumetric content is an example of an augmented reality (AR) experience. Volumetric content can include volumetric videos and images of three-dimensional spaces captured in three-dimensions (as well as audio signals recorded with volumetric videos and images). Recording of volumetric content includes volumetrically capturing elements of the three-dimensional space such as objects and human beings using a combination of cameras and sensors. Volumetric content includes a volumetric representation of one or more three-dimensional elements (e.g., an object or a person) of a three-dimensional space. A volumetric representation of an element (e.g., an AR content item) refers to a visual representation of the three-dimensional element in three-dimensions. The presentation of the volumetric content may include displaying one or more AR content items overlaid upon a real-world space, which may be the same as the three-dimensional space in which the volumetric video was captured or a different space. The presentation of the volumetric content may include displaying one or more content items in motion, displaying one or more content items performing a movement or other action, displaying one or more content items statically positioned, or combinations thereof. A content item may be displayed for a duration of the presentation of the volumetric content or a portion thereof.

The presentation of the volumetric content may include tracking a location and movement of a user within their physical real-world environment and using the tracked location and movement of the user to allow the user to move around in and interact with the presentation of the volumetric content. As such, the presentation of the volumetric content may include displaying a content item from multiple perspectives depending on a user's movement and change in location. In this manner, the presentation of volumetric content provides an immersive AR experience to users.

Aspects of the present disclosure include systems, methods, techniques, instruction sequences, and computing machine program products to create immersive AR experiences from existing images and videos. Whether from a single video of a single scene or a series of images and videos about a trip, the volumetric content presentation system described herein allows users to create immersive experiences using metadata and visual details.

In an example, an existing image depicts a dog playing with a ball in a park. The volumetric content presentation system 100 segments different components of the image to render them in AR. Grass from the park turns the floor green, background from the picture turns the wall to a similar shade, and the dog and ball are segmented and placed as a "clone" in AR in the physical world. For some embodiments, the system performs segmentation automatically. For some embodiments, segmentation may rely on user input is if an image contains too many key elements. Additionally, using metadata such as weather, the system can render AR clouds for a cloudy day or snow if it snowed that day. If it was windy, using AI, the system can create additional effects to blow the dog's hair, as if the dog was experiencing the wind. Although the current example addresses a location-independent scenario, the creation of immersive AR experiences can be location-dependent and perhaps more contextual as well. For some embodiments, the experience can be made more immersive using IoT/smart devices such as by triggering a smart fan to add the wind effect.

FIG. 1 is a block diagram showing an example volumetric content presentation system 100 for presenting volumetric content. The volumetric content presentation system 100 includes of a client device 102. The client device 102 hosts a number of applications including a presentation client 104. Each presentation client 104 is communicatively coupled to a presentation server system 108 via a network 106 (e.g., the Internet). In an example, the client device 102 is a wearable device (e.g., smart glasses) worn by the user 124 that includes a camera and optical elements that include a transparent display through which the real-world environment is visible to the user 124.

A presentation client 104 is able to communicate and exchange data with another presentation client 104 and with the presentation server system 108 via the network 106. The data exchanged between the presentation client 104, and between another presentation client 104 and the presentation server system 108, includes functions (e.g., commands to invoke functions) as well as payload data (e.g., text, audio, video or other multimedia data).

The presentation server system 108 provides server-side functionality via the network 106 to a particular presentation client 104. While certain functions of the volumetric content presentation system 100 are described herein as being performed by either a presentation client 104 or by the presentation server system 108, the location of certain functionality either within the presentation client 104 or the presentation server system 108 is a design choice. For example, it may be technically preferable to initially deploy certain technology and functionality within the presentation server system 108, but to later migrate this technology and functionality to the presentation client 104 where the client device 102 has a sufficient processing capacity.

The presentation server system 108 supports various services and operations that are provided to the presentation client 104. Such operations include transmitting data to, receiving data from, and processing data generated by the presentation client 104. This data may include volumetric content (e.g., volumetric videos), message content, device information, geolocation information, media annotation and overlays, message content persistence conditions, social network information, and live event information, as examples. Data exchanges within the volumetric content presentation system 100 are invoked and controlled through functions available via user interfaces (UIs) and of the presentation client 104.

Turning now specifically to the presentation server system 108, an Application Program Interface (API) server 110 is coupled to, and provides a programmatic interface to, an application server 112. The application server 112 is communicatively coupled to a database server 114, which facilitates access to a database 116 in which is stored data associated with messages processed by the application server 112.

The Application Program Interface (API) server 110 receives and transmits message data (e.g., commands and message payloads) between the client device 102 and the application server 112. Specifically, the Application Program Interface (API) server 110 provides a set of interfaces (e.g., routines and protocols) that can be called or queried by the presentation client 104 in order to invoke functionality of the application server 112. The API server 110 exposes various functions supported by the application server 112, including account registration, login functionality, the sending of messages, via the application server 112, from a particular presentation client 104 to another presentation client 104, the sending of media files (e.g., volumetric videos) to the presentation client 104, the setting of a collection of media data (e.g., story), the retrieval of a list of friends of a user of a client device 102, the retrieval of such collections, the retrieval of messages and content, the adding and deletion of friends to a social graph, the location of friends within a social graph, and opening an application event (e.g., relating to the presentation client 104).

The application server 112 hosts a number of applications and subsystems, including a presentation server 118, an image processing server 120 and a social networking server 122. The presentation server 118 is generally responsible for managing volumetric content and facilitating presentation thereof by the client device 102. The image processing server 120 is dedicated to performing various image processing operations, typically with respect to images or video generated and displayed by the client device 102. The presentation server 118 and image processing server 120 may work in conjunction to provide one or more AR experiences to the user 124. For example, the presentation server 118 and image processing server 120 may work in conjunction to support presentation of volumetric content by the client device 102. Further details regarding presentation of volumetric content are discussed below.

The social networking server 122 supports various social networking functions and services, and makes these functions and services available to the presentation server 118. To this end, the social networking server 122 maintains and accesses an entity graph within the database 116. Examples of functions and services supported by the social networking server 122 include the identification of other users of the volumetric content presentation system 100 with which a particular user has relationships or is "following", and also the identification of other entities and interests of a particular user.

The application server 112 is communicatively coupled to a database server 114, which facilitates access to a database 116 in which is stored data associated with content presented by the presentation server 118 and image processing server 120.

The presentation server system 108 may further communicate and exchange data with one or more network-connected device(s) 126. For some devices, the presentation server system 108 may communicate and exchange data directly with a network-connected device(s) 126 while in other instances the presentation server system 108 may communicate and exchange data with a network-connected device(s) 126 via a network service(s) 128 (e.g., a third-party application). The network service(s) 128 may, for example, expose one or more APIs for communicating with a network-connected device(s) 126. Examples of data communicated between the presentation server system 108 and the one or more network-connected devices include device state data and sensor data along with or as part of various requests and commands. As shown in FIG. 1, in some embodiments, the client device 102 (e.g., display device such as glasses 200 in FIG. 2A) is distinct from network-connected device(s) 126.

The term "network-connected devices" as used herein includes devices known to those skilled in the art as "IoT devices." As such, a network-connected device(s) 126 may include common household and other devices that a standard end user might encounter such as smart lamps and lightbulbs, thermostats, smart televisions, smart speakers, smart switches, smart appliances (e.g., washers, dryers, ranges, and microwaves), navigation systems, and the like.

Figure 2A:
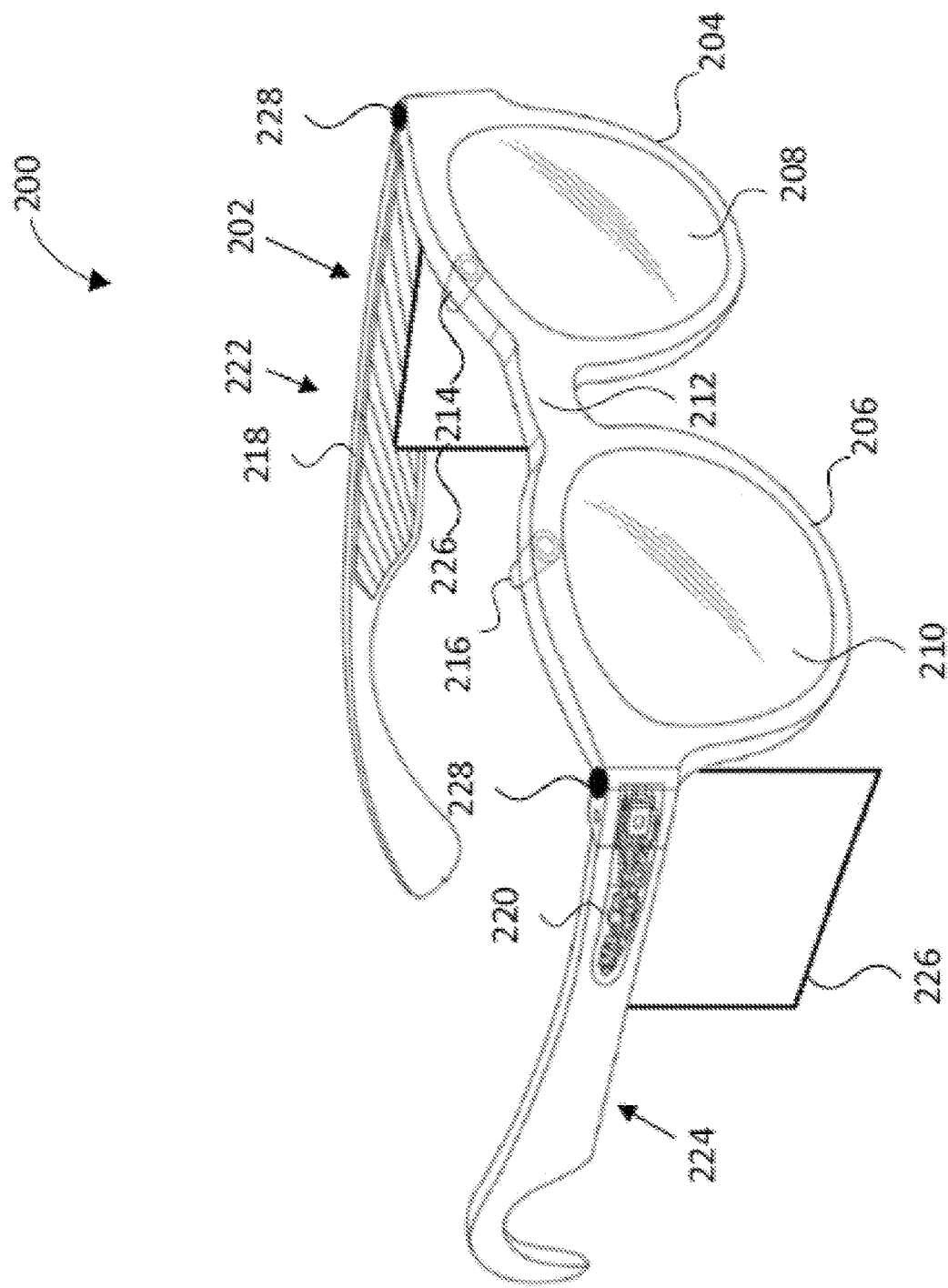
FIG. 2A is a perspective view of a head-worn device, in accordance with some example embodiments.

FIG. 2A is perspective view of a head-worn display device (e.g., glasses 200), in accordance with some examples. The glasses 200 are an example of the client device 102 of FIG. 1. The glasses 200 are capable of displaying content and are thus an example of a display device, which is referenced below. In addition, the display capabilities of the glasses 200 support AR experiences and the glasses 200 are thus an example of an AR device. As noted above, AR experiences include application of virtual content to real-world environments whether through presentation of the virtual content by transparent displays through which a real-world environment is visible or through augmenting image data to include the virtual content overlaid on real-world environments depicted therein.

The glasses 200 can include a frame 202 made from any suitable material such as plastic or metal, including any suitable shape memory alloy. In one or more examples, the frame 202 includes a first or left optical element holder 204 (e.g., a display or lens holder) and a second or right optical element holder 206 connected by a bridge 212. A first or left optical element 208 and a second or right optical element 210 can be provided within respective left optical element holder 204 and right optical element holder 206. The right optical element 210 and the left optical element 208 can be a lens, a display, a display assembly, or a combination of the foregoing. Any suitable display assembly can be provided in the glasses 200.

The frame 202 additionally includes a left arm or temple piece 222 and a right arm or temple piece 224. In some examples the frame 202 can be formed from a single piece of material so as to have a unitary or integral construction.

The glasses 200 can include a computing device, such as a computer 220, which can be of any suitable type so as to be carried by the frame 202 and, in one or more examples, of a suitable size and shape, so as to be partially disposed in one of the temple piece 222 or the temple piece 224. The computer 220 can include one or more processors with memory, wireless communication circuitry, and a power source. As discussed below, the computer 220 comprises low-power circuitry, high-speed circuitry, and a display processor. Various other examples may include these elements in different configurations or integrated together in different ways. Additional details of aspects of computer 220 may be implemented as illustrated by the data processor 302 discussed below.

The computer 220 additionally includes a battery 218 or other suitable portable power supply. In some examples, the battery 218 is disposed in left temple piece 222 and is electrically coupled to the computer 220 disposed in the right temple piece 224. The glasses 200 can include a connector or port (not shown) suitable for charging the battery 218, a wireless receiver, transmitter or transceiver (not shown), or a combination of such devices.

The glasses 200 include a first or left camera 214 and a second or right camera 216. Although two cameras are depicted, other examples contemplate the use of a single or additional (i.e., more than two) cameras. In one or more examples, the glasses 200 include any number of input sensors or other input/output devices in addition to the left camera 214 and the right camera 216. Such sensors or input/output devices can additionally include biometric sensors, location sensors, motion sensors, and so forth.

In some examples, the left camera 214 and the right camera 216 provide video frame data for use by the glasses 200 to extract 3D information from a real-world scene.

The glasses 200 may also include a touchpad 226 mounted to or integrated with one or both of the left temple piece 222 and right temple piece 224. The touchpad 226 is generally vertically-arranged, approximately parallel to a user's temple in some examples. As used herein, generally vertically aligned means that the touchpad is more vertical than horizontal, although potentially more vertical than that. Additional user input may be provided by one or more buttons 228, which in the illustrated examples are provided on the outer upper edges of the left optical element holder 204 and right optical element holder 206. The one or more touchpads 226 and buttons 228 provide a means whereby the glasses 200 can receive input from a user of the glasses 200.

Figure 2B:
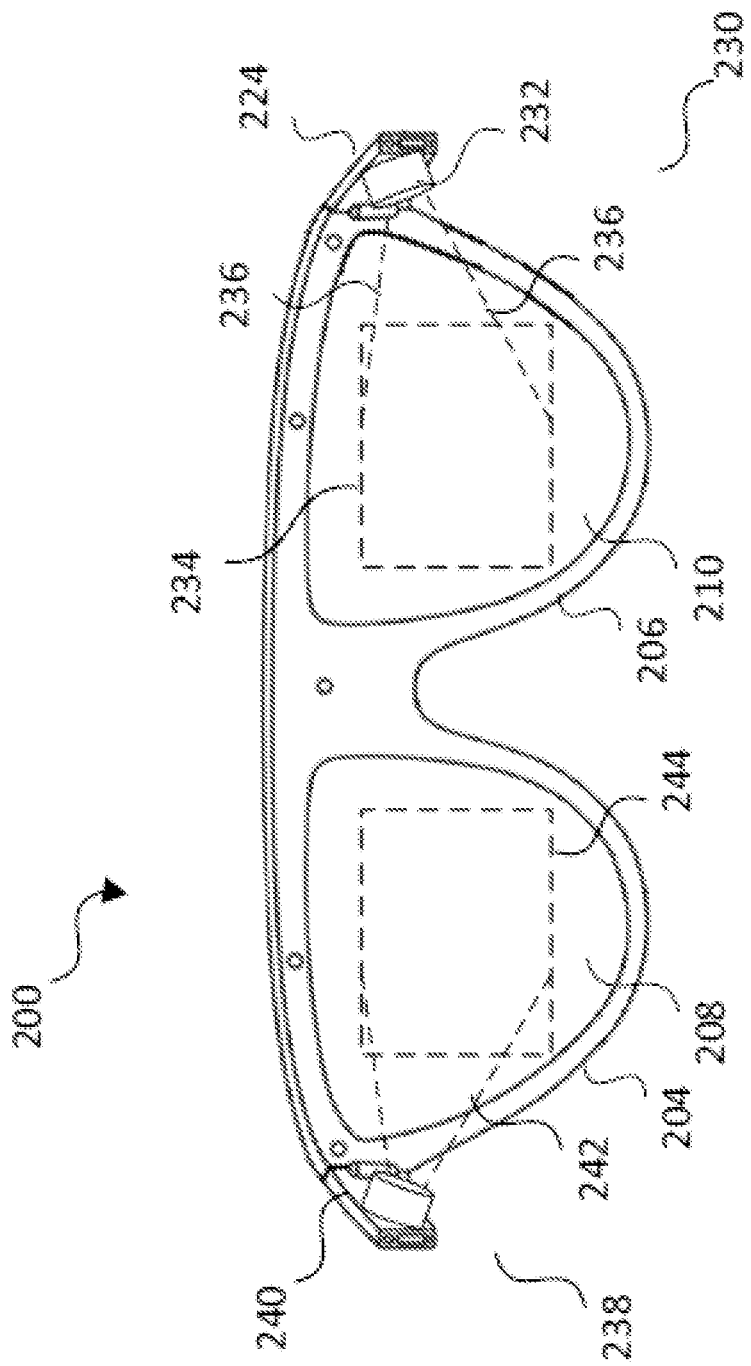
FIG. 2B illustrates a further view of the head-worn device of FIG. 2A, in accordance with some example embodiments.

FIG. 2B illustrates the glasses 200 from the perspective of a user. For clarity, a number of the elements shown in FIG. 2A have been omitted. As described in FIG. 2A, the glasses 200 shown in FIG. 2B include left optical element 208 and right optical element 210 secured within the left optical element holder 204 and the right optical element holder 206 respectively.

The glasses 200 include forward optical assembly 230 comprising a right projector 232 and a right near eye display 234, and a forward optical assembly 238 including a left projector 240 and a left near eye display 244.

In some examples, the near eye displays are waveguides. The waveguides include reflective or diffractive structures (e.g., gratings and/or optical elements such as mirrors, lenses, or prisms). Light 236 emitted by the projector 232 encounters the diffractive structures of the waveguide of the near eye display 234, which directs the light towards the right eye of a user to provide an image on or in the right optical element 210 that overlays the view of the real world seen by the user. Similarly, light 242 emitted by the projector 240 encounters the diffractive structures of the waveguide of the near eye display 244, which directs the light towards the left eye of a user to provide an image on or in the left optical element 208 that overlays the view of the real world seen by the user. The combination of a GPU, the forward optical assembly 230, the left optical element 208, and the right optical element 210 provide an optical engine of the glasses 200. The glasses 200 use the optical engine to generate an overlay of the real world view of the user including display of a 3D user interface to the user of the glasses 200.

It will be appreciated however that other display technologies or configurations may be utilized within an optical engine to display an image to a user in the user's field of view. For example, instead of a projector 232 and a waveguide, an LCD, LED or other display panel or surface may be provided.

In use, a user of the glasses 200 will be presented with information, content and various 3D user interfaces on the near eye displays. As described in more detail herein, the user can then interact with the glasses 200 using a touchpad 226 and/or the buttons 228, voice inputs or touch inputs on an associated device (e.g. client device 328 illustrated in FIG. 3), and/or hand movements, locations, and positions detected by the glasses 200.

Figure 3:
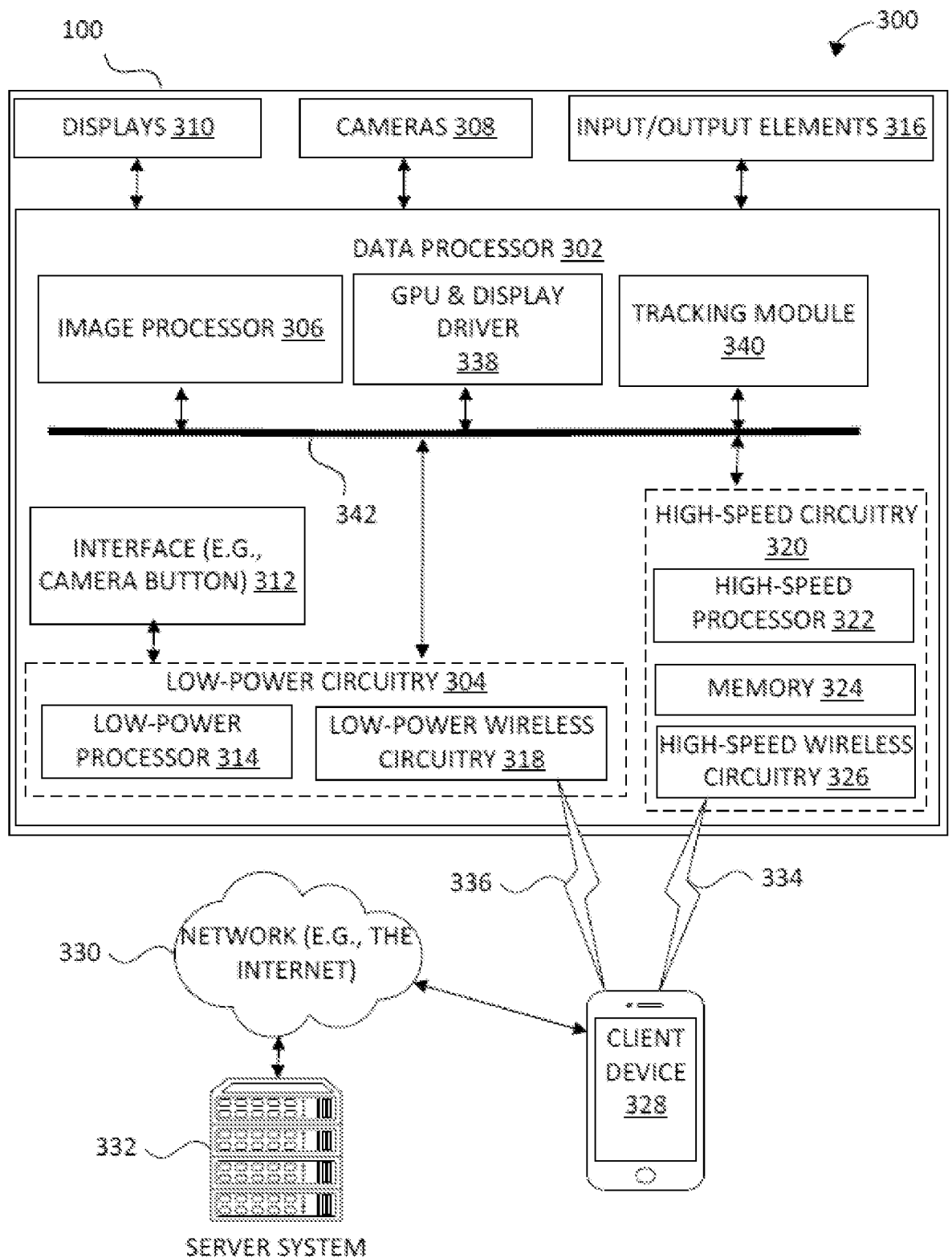
FIG. 3 is a block diagram illustrating a networked system including details of the head-worn device of FIG. 1, in accordance with some example embodiments.

FIG. 3 is a block diagram illustrating a networked system 300 including details of the glasses 200, in accordance with some examples. The networked system 300 includes the glasses 200, a client device 328, and a server system 332. The client device 328 may be a smartphone, tablet, phablet, laptop computer, access point, or any other such device capable of connecting with the glasses 200 using a low-power wireless connection 336 and/or a high-speed wireless connection 334. The client device 328 is connected to the server system 332 via the network 330. The network 330 may include any combination of wired and wireless connections. The server system 332 may be one or more computing devices as part of a service or network computing system. The client device 328 and any elements of the server system 332 and network 330 may be implemented using details of the software architecture 920 or the machine 1000 described in FIG. 9 and FIG. 10 respectively.

The glasses 200 include a data processor 302, displays 310, one or more cameras 308, and additional input/output elements 316. The input/output elements 316 may include microphones, audio speakers, biometric sensors, additional sensors, or additional display elements integrated with the data processor 302. Examples of the input/output elements 316 are discussed further with respect to FIG. 9 and FIG. 10. For example, the input/output elements 316 may include any of I/O components 1018 including output components 1026, motion components 1034, and so forth. Examples of the displays 310 are discussed in FIG. 2B. In the particular examples described herein, the displays 310 include a display for the user's left and right eyes.

The data processor 302 includes an image processor 306 (e.g., a video processor), a GPU & display driver 338, a tracking module 340, an interface 312, low-power circuitry 304, and high-speed circuitry 320. The components of the data processor 302 are interconnected by a bus 342.

The interface 312 refers to any source of a user command that is provided to the data processor 302. In one or more examples, the interface 312 is a physical button that, when depressed, sends a user input signal from the interface 312 to a low-power processor 314. A depression of such button followed by an immediate release may be processed by the low-power processor 314 as a request to capture a single image, or vice versa. A depression of such a button for a first period of time may be processed by the low-power processor 314 as a request to capture video data while the button is depressed, and to cease video capture when the button is released, with the video captured while the button was depressed stored as a single video file. Alternatively, depression of a button for an extended period of time may capture a still image. In some examples, the interface 312 may be any mechanical switch or physical interface capable of accepting user inputs associated with a request for data from the cameras 308. In other examples, the interface 312 may have a software component, or may be associated with a command received wirelessly from another source, such as from the client device 328.

The image processor 306 includes circuitry to receive signals from the cameras 308 and process those signals from the cameras 308 into a format suitable for storage in the memory 324 or for transmission to the client device 328. In one or more examples, the image processor 306 (e.g., video processor) comprises a microprocessor integrated circuit (IC) customized for processing sensor data from the cameras 308, along with volatile memory used by the microprocessor in operation.

The low-power circuitry 304 includes the low-power processor 314 and the low-power wireless circuitry 318. These elements of the low-power circuitry 304 may be implemented as separate elements or may be implemented on a single IC as part of a system on a single chip. The low-power processor 314 includes logic for managing the other elements of the glasses 200. As described above, for example, the low-power processor 314 may accept user input signals from the interface 312. The low-power processor 314 may also be configured to receive input signals or instruction communications from the client device 328 via the low-power wireless connection 336. The low-power wireless circuitry 318 includes circuit elements for implementing a low-power wireless communication system. Bluetooth™ Smart, also known as Bluetooth™ low energy, is one standard implementation of a low power wireless communication system that may be used to implement the low-power wireless circuitry 318. In other examples, other low power communication systems may be used.

The high-speed circuitry 320 includes a high-speed processor 322, a memory 324, and a high-speed wireless circuitry 326. The high-speed processor 322 may be any processor capable of managing high-speed communications and operation of any general computing system used for the data processor 302. The high-speed processor 322 includes processing resources used for managing high-speed data transfers on the high-speed wireless connection 334 using the high-speed wireless circuitry 326. In some examples, the high-speed processor 322 executes an operating system such as a LINUX operating system or other such operating system. In addition to any other responsibilities, the high-speed processor 322 executing a software architecture for the data processor 302 is used to manage data transfers with the high-speed wireless circuitry 326. In some examples, the high-speed wireless circuitry 326 is configured to implement Institute of Electrical and Electronic Engineers (IEEE) 802.11 communication standards, also referred to herein as Wi-Fi. In other examples, other high-speed communications standards may be implemented by the high-speed wireless circuitry 326.

The memory 324 includes any storage device capable of storing camera data generated by the cameras 308 and the image processor 306. While the memory 324 is shown as integrated with the high-speed circuitry 320, in other examples, the memory 324 may be an independent stand-alone element of the data processor 302. In some such examples, electrical routing lines may provide a connection through a chip that includes the high-speed processor 322 from image processor 306 or the low-power processor 314 to the memory 324. In other examples, the high-speed processor 322 may manage addressing of the memory 324 such that the low-power processor 314 will boot the high-speed processor 322 any time that a read or write operation involving the memory 324 is desired.

The tracking module 340 estimates a pose of the glasses 200. For example, the tracking module 340 uses image data and corresponding inertial data from the cameras 308 and position components, as well as GPS data, to track a location and determine a pose of the glasses 200 relative to a frame of reference (e.g., real-world environment). The tracking module 340 continually gathers and uses updated sensor data describing movements of the glasses 200 to determine updated three-dimensional poses of the glasses 200 that indicate changes in the relative position and orientation relative to physical objects in the real-world environment. The tracking module 340 permits visual placement of virtual content relative to physical objects by the glasses 200 within the field of view of the user via the displays 310.

The GPU & display driver 338 may use the pose of the glasses 200 to generate frames of virtual content or other content to be presented on the displays 310 when the glasses 200 are functioning in a traditional augmented reality mode. In this mode, the GPU & display driver 338 generates updated frames of virtual content based on updated three-dimensional poses of the glasses 200, which reflect changes in the position and orientation of the user in relation to physical objects in the user's real-world environment.

One or more functions or operations described herein may also be performed in an application resident on the glasses 200 or on the client device 328, or on a remote server. The glasses 200 may be a stand-alone client device that is capable of independent operation or may be a companion device that works with a primary device to offload intensive processing and/or exchange data over the network 106 with the presentation server system 108. The glasses 200 may also be communicatively coupled with a companion device such as a smart watch and may be configured to exchange data with the companion device. The glasses 200 may further include various components common to mobile electronic devices such as smart glasses or smart phones (for example, including a display controller for controlling display of visual media on a display mechanism incorporated in the device).

Figure 4:
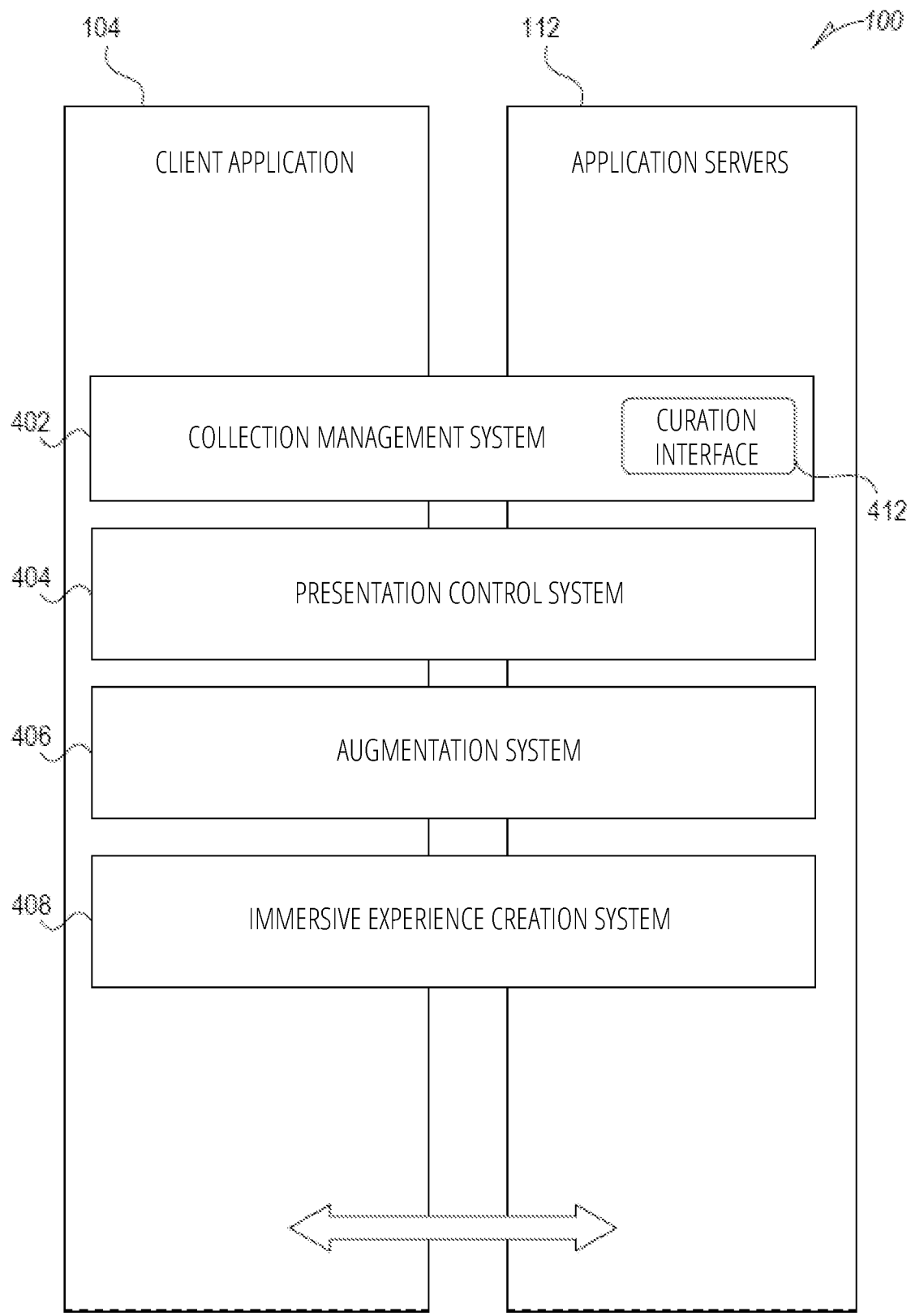
FIG. 4 is a diagrammatic representation of the volumetric content presentation system, in accordance with some examples embodiments, that has both client-side and server-side functionality.

FIG. 4 is a block diagram illustrating further details regarding the volumetric content presentation system 100, according to some examples. Specifically, the volumetric content presentation system 100 is shown to comprise the presentation client 104 and the application servers 112. The volumetric content presentation system 100 embodies a number of subsystems, which are supported on the client-side by the presentation client 104 and on the sever-side by the application servers 112. These subsystems include, for example, a collection management system 402, a presentation control system 404, an augmentation system 406, and an immersive experience creation system 408.

The collection management system 402 is responsible for managing sets or collections of content (e.g., collections of text, image, video, and audio data). A collection of content may be organized into an "event gallery" or an "event story." Such a collection may be made available for a specified time period, such as the duration of an event to which the content relates. For example, content relating to a music concert may be made available as a "story" for the duration of that music concert. The collection management system 402 may also be responsible for publishing an icon that provides notification of the existence of a particular collection to the user interface of the presentation client 104.

The collection management system 402 furthermore includes a curation interface 412 that allows a collection manager to manage and curate a particular collection of content. For example, the curation interface 412 enables an event organizer to curate a collection of content relating to a specific event (e.g., delete inappropriate content or redundant messages). Additionally, the collection management system 402 employs machine vision (or image recognition technology) and content rules to automatically curate a content collection.

The presentation control system 404 is responsible for facilitating and controlling volumetric content presentation. As such, the presentation control system 404 provides a mechanism that allows users to specify control operations for controlling volumetric content presentation. Control operations may, for example, include: a stop operation to stop the presentation; a pause operation to pause the presentation; a fast-forward operation to advance the presentation at a higher speed; a rewind operation to rewind the presentation; a zoom-in operation to increase a zoom level of the presentation; a zoom-out operation to decrease the zoom level of the presentation; and a playback speed modification operation to change the speed of the presentation (e.g., to produce a slow-motion presentation of the volumetric video).

For some embodiments, a user may specify input indicative of a control operation for controlling presentation of volumetric content by providing one or more inputs via one or more I/O components (examples of which are described in further detail below in reference to FIG. 10). For some embodiments, the presentation control system 404 may provide an interactive control interface comprising one or more interactive elements (e.g., virtual buttons) to trigger a control operation and the presentation control system 404 monitors interaction with the interactive interface to detect input indicative of a control operation. For some embodiments, a user may trigger a control operation using a gesture such as a hand or head gesture that can be associated with a specific control operation.

The augmentation system 406 provides various functions that enable a user to augment (e.g., annotate or otherwise modify or edit) media content. For example, the augmentation system 406 provides functions related to the generation, publication, and application of augmentation data such as media overlays (e.g., image filters) to volumetric content. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text or image that can be overlaid on top of a photograph taken by the client device 102. The augmentation system 406 operatively supplies one or more media overlays to the presentation client 104 based on a geolocation of the client device 102 or based on other information, such as social network information of the user of the client device 102. The media overlays may be stored in the database 116 and accessed through the database server 114.

Filters are an example of media overlays that are displayed as overlaid on an image or video during presentation to a user. Filters may be of various types, including user-selected filters from a set of filters presented to a user by the presentation client 104. Other types of filters include geolocation filters (also known as geo-filters), which may be presented to a user based on geographic location. For example, geolocation filters specific to a neighborhood or special location may be presented within a user interface by the presentation client 104, based on geolocation information determined by a Global Positioning System (GPS) unit of the client device 102.

Another type of filter is a data filter, which may be selectively presented to a user by the presentation client 104, based on other inputs or information gathered by the client device 102. Examples of data filters include current temperature at a specific location, a current speed at which a sending user is traveling, battery life for a client device 102, or the current time.

AR content items are another example of media overlays. An AR content item may be a real-time special effect and/or sound that can be added to an image or a video including volumetric images and videos.

Generally, AR content items, overlays, image transformations, images, and similar terms refer to modifications that may be applied to image data (e.g., videos or images) including volumetric content. This includes real-time modifications, which modify an image as it is captured using device sensors (e.g., one or multiple cameras) of a client device 102 and then displayed by a display device of the client device 102 (e.g., an embedded display of the client device) with the modifications. This also includes modifications to stored content, such as volumetric videos in a gallery or collection that may be modified. For example, in a client device 102 with access to multiple AR content items, a user can use a single volumetric video with multiple AR content items to see how the different AR content items will modify the stored content. For example, multiple augmented reality content items that apply different pseudorandom movement models can be applied to the same content by selecting different AR content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such augmentation systems to modify content using augmentation data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). AR content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, volumetric videos, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be augmented (e.g., edited), elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of an object's elements, characteristic points for each element of an object are calculated (e.g., using an Active Shape Model (ASM) or other known methods). Then, a mesh based on the characteristic points is generated for each of the at least one element of the object. This mesh can be used in the following stage of tracking the elements of the object in the video stream. In the process of tracking, the mentioned mesh for each element is aligned with a position of each element. Then, additional points are generated on the mesh. A set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification, properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

The augmentation system 406 can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform video and image content can be used by the augmentation system 406 where a neural network operates as part of a presentation client 104 operating on the client device 102. The augmentation system 406 determines the presence of a face within the image or video stream and provides interactive modification elements (e.g., icons) associated with a computer animation model to transform image data, or the computer animation model can be present as associated with an interface described herein. The interactive modification elements include changes that may be the basis for modifying the user's face within the image or video content as part of the modification operation. Once a modification icon is selected, the transform system initiates a process to convert the image of the user to reflect the selected modification icon (e.g., generate a smiling face on the user). Modified image or video content may be presented in a graphical user interface displayed on the client device 102 as soon as the image or video stream is captured, and a specified modification is selected. The augmentation system 406 may implement a complex convolutional neural network on a portion of the image or video content to generate and apply the selected modification. That is, the user may be presented with modified content in real-time or near real-time. Further, the modification may be persistent while the content is being presented. Machine taught neural networks may be used to enable such modifications.

The immersive experience creation system 408 is responsible for creating immersive AR experiences based on existing images and videos. In doing so, the immersive experience creation system 408 may utilize one or more known machine learning or artificial intelligence image processing techniques to segment images and videos to identify key elements. The immersive experience creation system 408 generates volumetric content items for each of the key elements that can be utilized in creating immersive AR experiences. Further details regarding the creation and presentation of the immersive AR experiences are discussed below.

Figure 5:
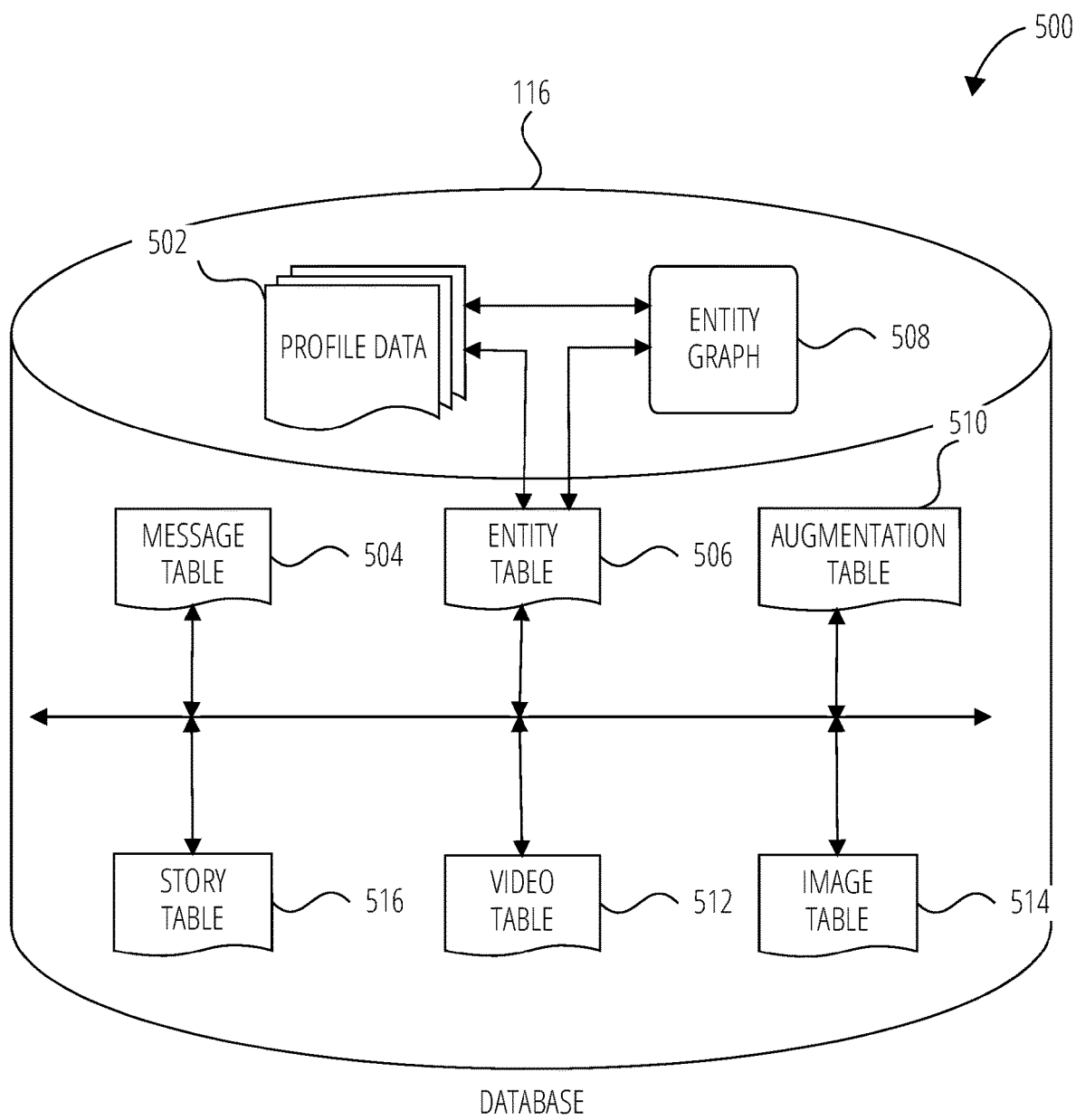
FIG. 5 is a diagrammatic representation of a data structure as maintained in a database, in accordance with some example embodiments.

FIG. 5 is a diagrammatic representation of a data structure 500 as maintained in the database 116, in accordance with some examples. While the content of the database 116 is shown to comprise a number of tables, it will be appreciated that the data could be stored in other types of data structures (e.g., as an object-oriented database).

An entity table 506 stores entity data, and is linked (e.g., referentially) to an entity graph 508 and profile data 502. Entities for which records are maintained within the entity table 506 may include individuals, corporate entities, organizations, objects, places, events, and so forth. Regardless of entity type, any entity regarding which the presentation server system 108 stores data may be a recognized entity. Each entity is provided with a unique identifier, as well as an entity type identifier (not shown). The entity table 506 may associate various augmentations from the augmentation table 510 with various images and videos stored in the image table 514 and the video table 512.

The entity graph 508 stores information regarding relationships and associations between entities. Such relationships may be social, professional (e.g., work at a common corporation or organization) interested-based or activity-based, merely for example.

The profile data 502 stores multiple types of profile data about a particular entity. The profile data 502 may be selectively used and presented to other users of the volumetric content presentation system 100, based on privacy settings specified by a particular entity. Where the entity is an individual, the profile data 502 includes, for example, a user name, telephone number, address, settings (e.g., notification and privacy settings), as well as a user-selected avatar representation (or collection of such avatar representations).

The database 116 also stores augmentation data, such as overlays including AR content items and filters, in an augmentation table 510. The augmentation data is associated with and applied to videos (for which data is stored in a video table 512) and images (for which data is stored in an image table 514) including volumetric videos and images.

A story table 516 stores data regarding collections of content including associated image, video, or audio data that are compiled into a collection (e.g., a story or a gallery). The creation of a particular collection may be initiated by a particular user (e.g., each user for which a record is maintained in the entity table 506). A user may create a "personal story" in the form of a collection of content that has been created and sent/broadcast by that user. To this end, the user interface of the presentation client 104 may include an icon that is user-selectable to enable a sending user to add specific content to his or her personal story.

As mentioned above, the video table 512 stores video data that includes volumetric videos. Similarly, the image table 514 stores image data that that includes volumetric images.

Figure 6:
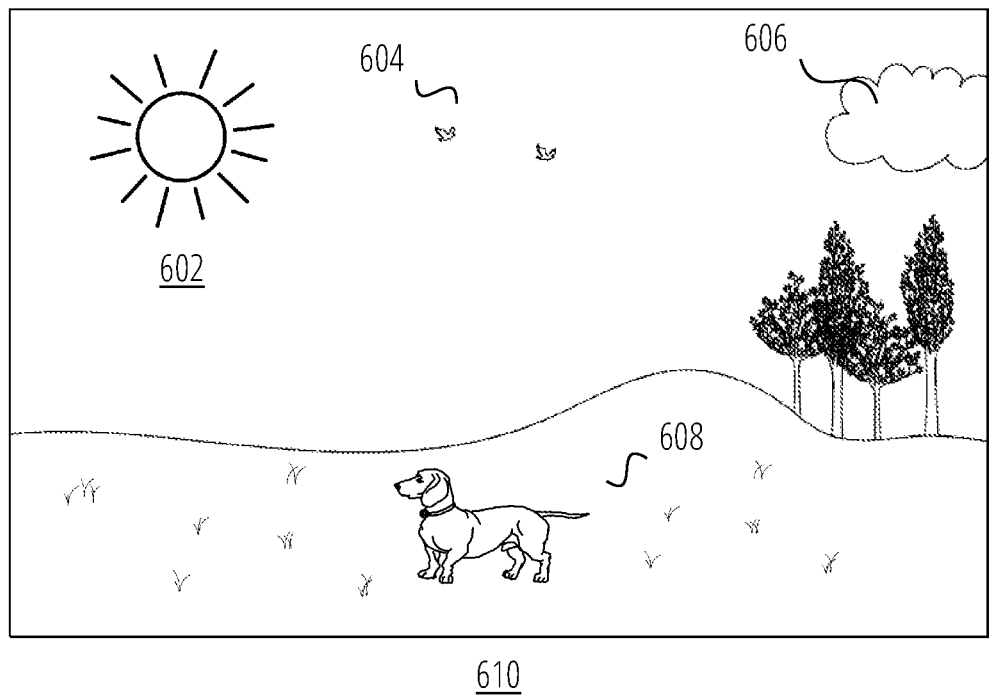
FIG. 6 is a conceptual diagram illustrating an embodiment in which the volumetric content presentation system identifies one or more two-dimensional elements from an image data to be presented in augmented reality, in accordance with some example embodiments.
Figure 6:
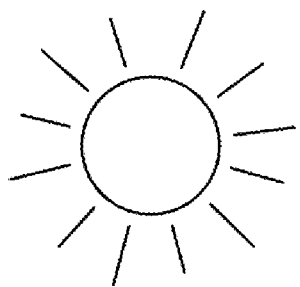

FIG. 6 is a conceptual diagram illustrating an example in which the volumetric content presentation system 100 identifies one or more two-dimensional elements from a two-dimensional image 610 to be presented as part of an augmented reality experience. As shown, the two-dimensional image 610 includes multiple two-dimensional elements: a sun 602, two birds 604, a piece of cloud 606, a dog 608, a grass field, and trees. To individually identify the elements in the two-dimensional image 610, the volumetric content presentation system 100 may perform image segmentation on the two-dimensional image 610 using various known segmentation algorithms. In addition, in this example, cloud 606 is identified based on user input.

The volumetric content presentation system 100 generates volumetric content items based on the two-dimensional elements identified in the two-dimensional image 610. For example, the volumetric content presentation system 100 generates a volumetric content item 612 based on the sun 602 identified in the two-dimensional image 610. In generating the volumetric content items, the volumetric content presentation system 100 may adjust the dimensions of the volumetric content items either automatically based on image analysis or based on user-inputs. That, the volumetric content presentation system 100 may utilize one or more scaling techniques in generating the volumetric content item 612.

Figure 7A:
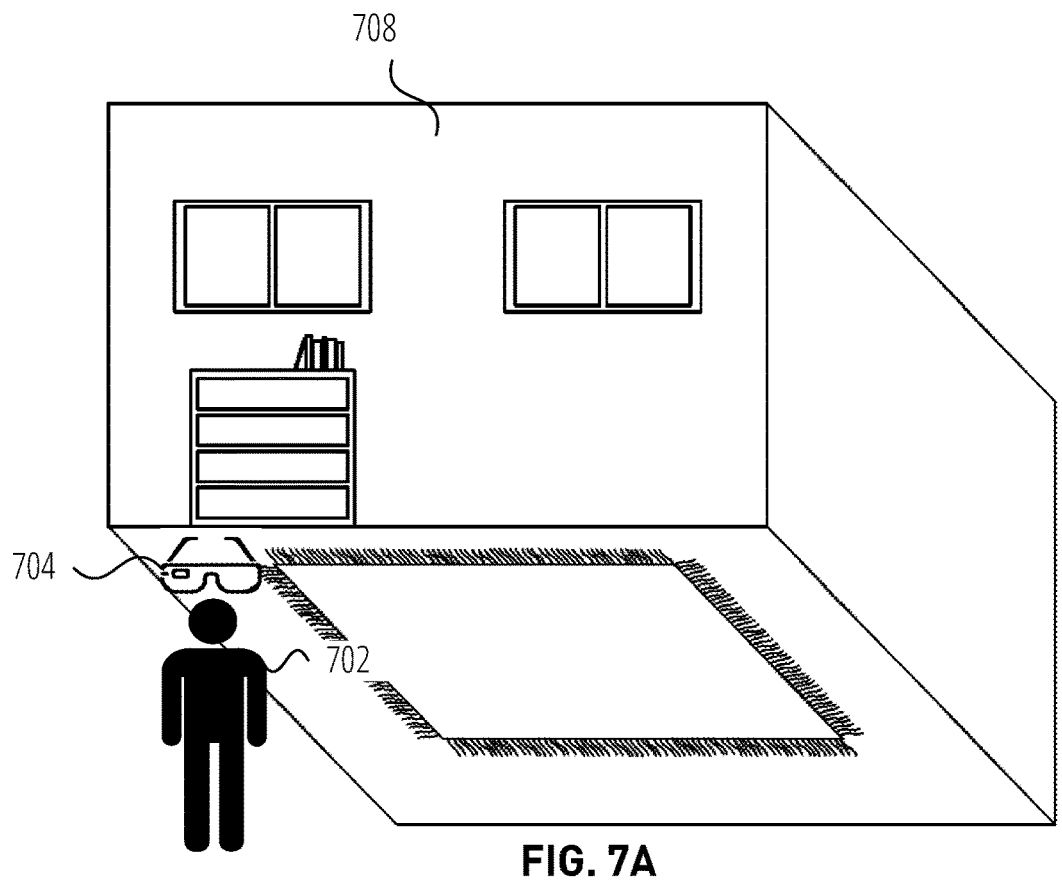
FIG. 7A is a conceptual diagram that illustrates a field of view of a user before the one or more volumetric content items are overlaid on a real-world environment, in accordance with some example embodiments.
Figure 7B:
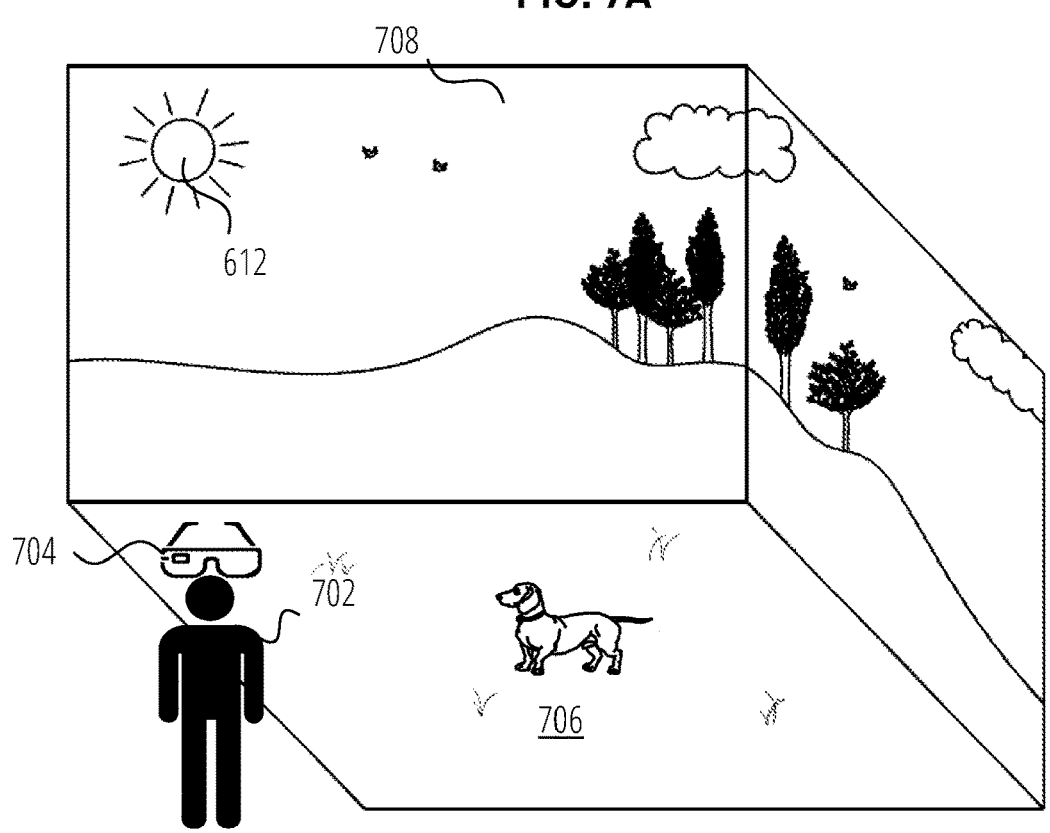
FIG. 7B is a conceptual diagram that illustrates a fields of view of a user after the one or more volumetric content items are overlaid on a real-world environment, in accordance with some example embodiments.

FIGS. 7A and 7B are conceptual diagrams that illustrate an example augmented reality experience provided to a user 702 of a user device 704. The user device 704 is an example of the client device 102 of FIG. 1. FIG. 7A illustrates an example field of view of a user standing in a real-world environment, which in this example is a room. As shown, multiple real-world elements are in the field of view of the user 124, including a floor, walls, windows, and a book shelf.

FIG. 7B illustrates an example field of view of the user 702 after the volumetric content presentation system 100 causes the user device 704 to present the volumetric content items overlaid on the real-world environment. The volumetric content item representing a grass field is presented as an overlay on the ground surface, the volumetric content items representing the sun, trees, and the cloud, are presented as overlays on the walls, the volumetric content item representing the dog 608 is placed on the floor as a "clone" in AR in the real-world environment (i.e., the room), providing an AR experience to the user 702. The dimensions of the volumetric content item 612 has also been adjusted (e.g., scaled) proportionally to fit the real-world environment.

Figure 8A:
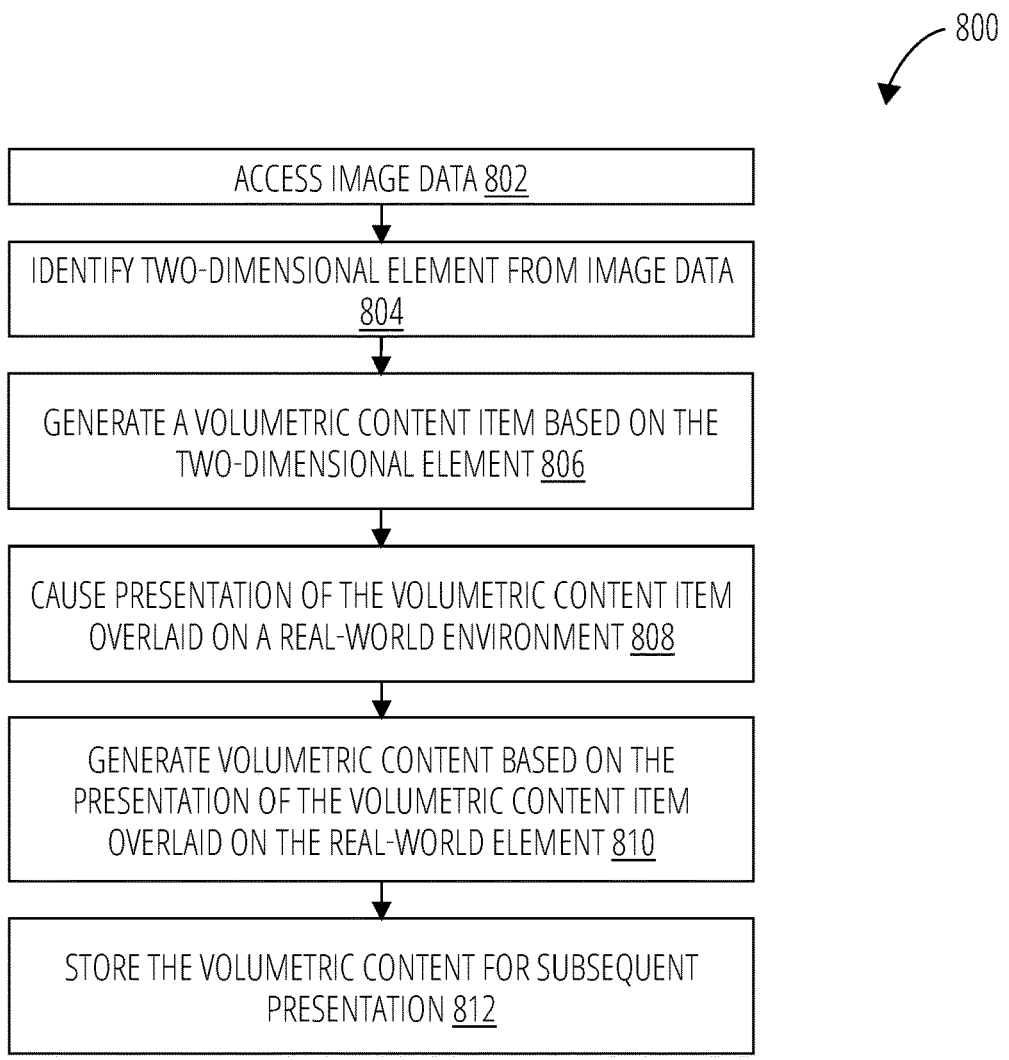
FIGS. 8A-8D are flowcharts illustrating operations of the volumetric content presentation system in performing a method for creating an immersive AR experience from existing image data, in accordance with some example embodiments.

FIG. 8A is a flowchart illustrating operations for the volumetric content presentation system 100 in performing method 800 for providing immersive AR experiences based on existing image data, in accordance with some examples. The method 800 may be embodied in computer-readable instructions for execution by one or more processors such that operations of the method 800 may be performed in part or in whole by the functional components of the volumetric content presentation system 100; accordingly, the method 800 is described below by way of example with reference thereto. However, it shall be appreciated that at least some of the operations of the method 800 may be deployed on various other hardware configurations than the volumetric content presentation system 100.

At operation 802, the volumetric content presentation system 100 accesses image data comprising one or more two-dimensional image. The image data may comprise any one or more of a digital image, a frame of a video, or a physical copy of a photograph. The image data may be stored in and accessed from a database (e.g., database 116), or a memory of a mobile device or a wearable device (e.g., client device 102).

In a first example, the image data includes a two-dimensional image that depicts a puppy running in a grassland. The image data is stored in a memory component of the client device 102. The volumetric content presentation system 100 access the image data from the memory component based on user input.

In a second examples, the image data includes a two-dimensional image based on a physical copy of a photo depicting the puppy running. The two-dimensional image may be generated by capturing a photo of the physical copy of the running-puppy photo in preparation for further operations.

At operation 804, the volumetric content presentation system 100 identifies a two-dimensional element depicted in the one or more two-dimensional images. The two-dimensional image element may correspond to either virtual or real-world objects. For example, the two-dimensional image element may correspond to an animal, a person, a plant, a landscape, an architecture, the sun, the moon, or the sky.

For some embodiments, to identify the two-dimensional image element, the volumetric content presentation system 100 performs image segmentation on the image data to identify and extract two-dimensional elements. The volumetric content presentation system 100 may utilize any one or more known digital image processing and computer vision techniques in performing image segmentation including known machine-learning and artificial intelligence image segmentation and classification techniques. For some embodiments, to segment or extract two-dimensional image elements from the one or more two-dimensional images, the volumetric content presentation system 100 relies on a user input to delineate at least some of the two-dimensional elements in the image.

At operation 806, the volumetric content presentation system 100 generates a volumetric content item based on the two-dimensional elements identified from the image data. The volumetric content item comprises a volumetric representation of the two-dimensional element identified from the two-dimensional image. The volumetric content item is of a format compatible to be presented using a client device, such that the volumetric content item appears to the user using the client device as parts of, and/or overlaid upon, their surrounding environment (e.g., the real-world environment). Returning to the example of the image of the puppy running in the grassland, a puppy, a grassland, and a sky are identified two-dimensional image elements. A volumetric content item is created for each one or more of the puppy, grassland and sky.

Hence, in some instances, a set of two-dimensional elements can be identified from image data and volumetric content items are only generated for a sub-set of the elements. The selection of the particular two-dimensional element or elements from the two-dimensional image elements identified through image segmentation may be performed automatically by the volumetric content presentation system 100, for some embodiments. Returning again to the example of the image of the puppy running in the grassland, though the puppy, the grassland, and the blue sky may all be identified based on image segmentation, the volumetric content presentation system 100 may select only the puppy for creation of a volumetric content item.

For some embodiments, to select a particular two-dimensional elements multiple identified two-dimensional elements, the volumetric content presentation system 100 provides an interactive interface operable to receive selection of one of multiple two-dimensional image elements for generation of a volumetric content item. The volumetric content presentation system 100 may, for example, cause the display device to present the interactive interface. The volumetric content presentation system 100 may receive input indicative of a selection of the two-dimensional image element for generation of a volumetric content item based on user interaction with the interactive interface. The interactive interface presents a plurality of two-dimensional image elements segmented from the image data and allows the user to select one or more two-dimensional elements for generation of a volumetric content item. In an example, image data includes a two-dimensional image depicting a road full of cars. The volumetric content presentation system 100 may identify each car as a segmented element of the image. In this example, the interactive interface presents the image in a manner such that the user is able to select a subset of the cars on the road as a basis for the generation of one or more volumetric content items.

At operation 808, the volumetric content presentation system 100 causes a display device to present the volumetric content item overlaid on a real-world environment that is visible within a field of view of a user of the display device. In this manner, the presentation of the volumetric content item makes the volumetric content items appear to be in the real-world environment.

For some embodiments, the presentation of the volumetric content item overlaid on the real-world environment is based on an associated between the volumetric content item and an element (or surface) in the real-world environment. Consistent with these embodiments, the causing of the presentation of the volumetric content item comprises identifying or detecting a real-world element in the real-world environment and generating or identifying an association between volumetric content item and the identified real-world element. Based on the association between the volumetric content item and the identified real-world element, the volumetric content presentation system 100 causes presentation of the volumetric content item overlaid on the real-world environment. For some embodiments, the volumetric content presentation system 100 causes the display device to present the volumetric content item overlaid on the real-world environment at a location within the real-world environment based on the association with the real-world element (e.g., at a location of the real-world element in the real-world environment). The real-world element includes an object or person in the real world. Some example real-world elements are a floor, a wall, and a table. By presenting the volumetric content item overlaid on an associated real-world element, the realism and immersive nature of the AR experience is enhanced. For example, a volumetric content item representing a grassland may be associated with a ground surface and presented as an overlay on the ground surface to provide an AR experience in which the user is standing and able to walk on the grassland.

To generate associations between the volumetric content item and the identified real-world element, the volumetric content presentation system 100 may provide an interactive interface operable to receive the associations between the volumetric content item and the real-world element. The volumetric content presentation system 100 may, for example, cause the display device to present the interactive interface. The volumetric content presentation system 100 receives input indicative of a selection of the associations between the volumetric content item and the real-world element from the interactive interface.

For some embodiments, the presentation of the volumetric content item may be automatically triggered in response to detecting a location of the wearable device being within a threshold distance of a location depicting by the one or more images. For example, the image data may include one or more images depicting a first location. The volumetric content presentation system 100 may determine the first location based, for example, on metadata associated with the image data. The volumetric content presentation system 100 may determine a second location associated with the display device (e.g., based on location data from the display device, a primary device to which the display device is a companion device, or a companion device of the display device). The volumetric content presentation system 100 may cause presentation of the volumetric content item in response to determining the second location is within the threshold distance of the first location.

For some embodiments, the presentation of the volumetric content item may include presentation of a visual effect in conjunction with the volumetric content item. For example, the volumetric content presentation system 100 may obtain metadata included in or associated with the image data and determine a visual effect to present in conjunction with the volumetric content item based on the obtained metadata. The metadata provides information about the image data including information about a real-world environment associated with the image data. The real-world environment associated with the image data may be the same real-world environment in which the volumetric content item is overlaid or a different real-world environment. In some examples, the information may include weather condition, date, time of the day, people, and location. The information corresponds to the time of creation of the image data. In a specific example, a two-dimensional image depicts a dog running in the rain. Metadata associated with the image includes weather data indicating a rain condition at the time of image generation. The metadata may include machine-generated data and/or user input. Metadata may be obtained from multiple sources including the image data, one or more camera devices that generated the image data, and third-party services.

A visual effect is determined and presented in conjunction with the volumetric content item based on the obtained metadata. The visual effect includes one or more augmentations to be applied to the real-world environment. The visual effect may comprise an animation. In an example, a rain animation is presented in conjunction with the presentation of the volumetric content item based on weather data from the metadata indicating a rain condition.

The volumetric content presentation system 100 causes the display device to apply the generated visual effect to the real-world environment in conjunction with the volumetric content item. The presentation of the visual effect causes the real-world environment to appear to the user as if the real-world environment is under a similar condition under which the two-dimensional image is taken. In an example, the real-world environment is an indoor office, and the metadata indicates a rainy weather condition. A visual effect that includes a rain animation is presented in conjunction with a volumetric content item as overlays on the user's field of view of the indoor office.

For some embodiments, the presentation of the volumetric content item includes a presentation of an animated effect associated with the volumetric content item based on a determined visual effect. The animated effect associated with the volumetric content item comprises a visual enhancement of the volumetric content item that makes it appear to be more consistent with the visual effect generated based on the metadata. In an example, presentation of volumetric representations of a dog, a grassland, and a sky are overlaid on a real-world environment in conjunction with a rain animation visual effect. In this example, the volumetric content presentation system 100 may cause presentation of three animated effects associated with the volumetric representations of the dog, grassland, and sky. The animated effect associated with the volumetric representation of the dog causes the dog to appear to be soaked; the animated effect associated with the volumetric representation of the grassland causes the grassland to appear to be wet and start to form small ponds; and the animated effect associated with the volumetric representation of the sky causes the sky to appear to be darker. As another example, when a windy visual effect is presented based on metadata, an animated effect associated with the volumetric representation of the dog causes animated wind to blow the hair of the dog.

In some embodiments, the presentation of the volumetric content item includes determining a real-world effect and causing a network-connected device (e.g., an IoT device or other smart device) to provide the real-world effect. The real-world effect may be associated with functionality provided by the network-connected device. Example network-connected devices include, for example, smart fans, smart thermostats, and smart light bulbs. A real-life effect can be created by causing the network-connect device in the real-world environment to perform certain functionality to create a condition in the real-world environment, which may be associated with a visual effect. The real-world effect may be determined from metadata associated with the image data. For example, a windy condition may be a real-world effect determined based on a metadata associated with the image data (e.g., weather data included in the metadata). Based on the determined windy condition associated with the image data, the volumetric content presentation system 100 may cause a smart fan in the real-world environment to be activated, causing a wind-like condition in the real-world environment thereby adding a real-life effect to the presentation of the volumetric content item. In another example, sun-drenched condition associated with the image data is determined based on metadata. In response, the volumetric content presentation system 100 may cause a smart thermostat to be activated at a high temperature and cause a smart light in the real-world environment to change color to bright yellow.

In some embodiments, the presentation the volumetric content item includes a presentation of one or more virtual objects in conjunction with the volumetric content item overlaid on the real-world environment. A virtual object is a computer-generated object that is imaginary, fictional, or no longer exists in the real-world. For example, a virtual object may be a dinosaur, a dragon that breathes fire, zombies, or wizards. The volumetric virtual items generated based on virtual objects may be stored in a library of volumetric virtual items (e.g., stored in the database 116).

At operation 810, the volumetric content presentation system 100 generates volumetric content based on the presentation of the volumetric content item overlaid on the real-world environment. The volumetric content may further include audio data comprising one or more audio signals and as such, the presentation of the volumetric content can include presenting one or more audio signals. The new volumetric content comprises the volumetric content item, one or more audio signals, and one or more elements of the real-world environment. In some instances, the volumetric content comprises the volumetric content item and a volumetric representation of the one or more elements of the real-world environment. The volumetric content presentation system 100 stores the volumetric content for subsequent presentation, at operation 812.

Figure 8B:
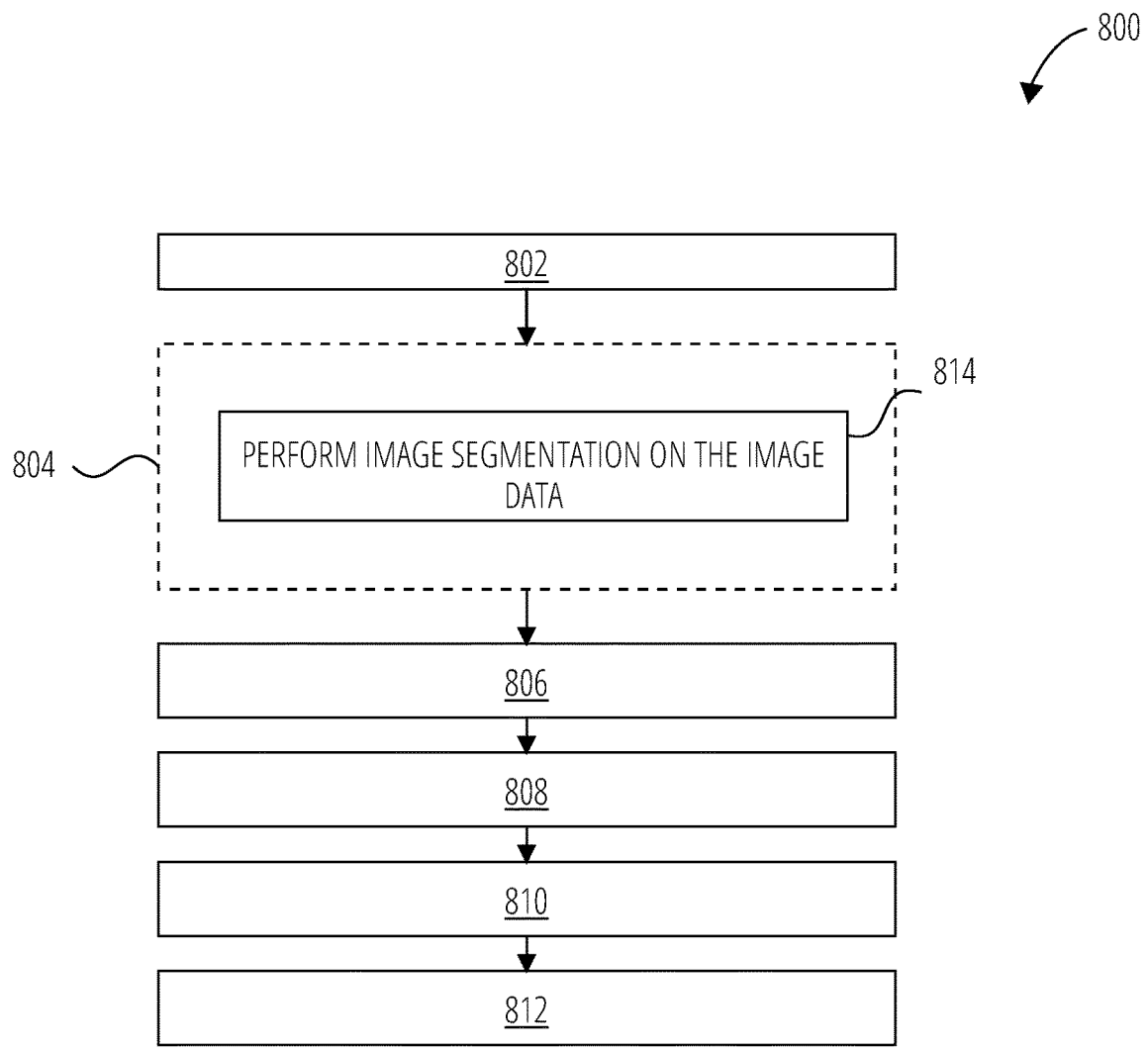

As shown in FIG. 8B, the method 800 may, in some embodiments, further include operation 814. Consistent with these embodiments, the operation 814 may be performed as part of operation 804 where the volumetric content presentation system 100 identifies a two-dimensional element depicted in the one or more two-dimensional images. As noted above, the two-dimensional image element may correspond to either virtual or real-world objects such as an animal, a persons, a plant, a landscape, a architecture, the sun, the moon, or the sky. At operation 814, the volumetric content presentation system 100 performs image segmentation on the image data to identify the two-dimensional element. In performing the image segmentation, the volumetric content presentation system 100 may utilize any one or more known digital image processing and computer vision techniques including known machine-learning and artificial intelligence image segmentation and classification techniques.

Figure 8C:
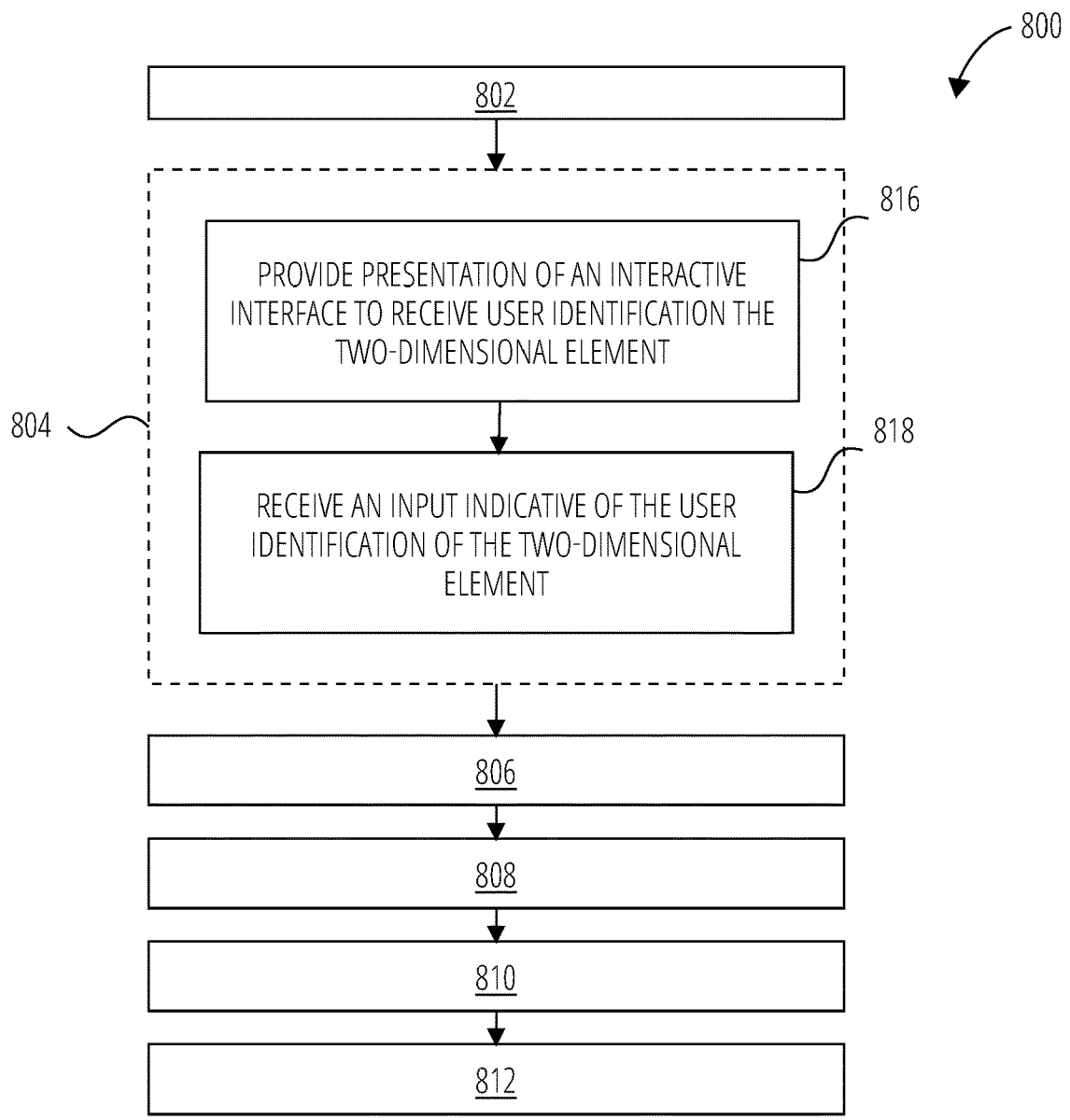

As shown in FIG. 8C, the method 800 may, in some embodiments, further include operations 816 and 818. Consistent with these embodiments, the operations 816 and 818 may be performed as part of the operation 804 where the volumetric content presentation system 100 identifies a two-dimensional element depicted in the one or more two-dimensional images. At operation 816, the volumetric content presentation system 100 provides an interactive interface that enables a user to identify the two-dimensional element from the image data. Accordingly, the interactive interface may include a presentation of the image data along with one or more interactive elements that allow the user to select and/or specify a two-dimensional element depicted in the image data. In providing the interactive interface, the volumetric content presentation system 100 may cause a user device (e.g., the client device 102) to present the interactive interface.

At operation 818, the volumetric content presentation system 100 receives an input indicative of the user identification of the two-dimensional element. In some examples, the input is generating by the user 124 delineating the two-dimensional element in the image using touch, a gesture, or one or more interactive elements.

Figure 8D:
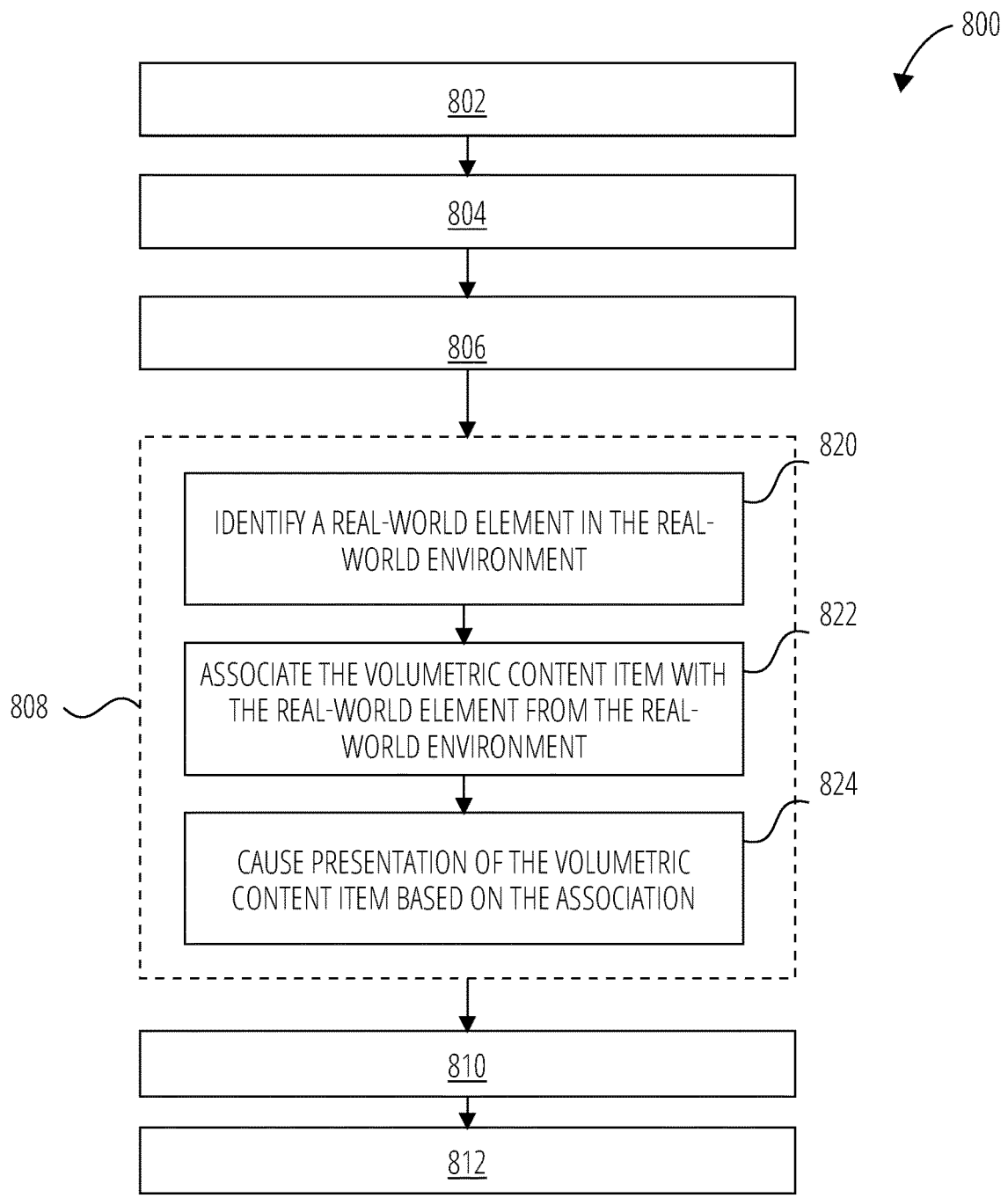

As shown in FIG. 8D, the method 800 may, in some embodiments, further include operations 820, 822, and 824. Consistent with these embodiments, the operations 820, 822, and 824 may be performed as part of the operation 806 where the volumetric content presentation system 100 causes presentation of the volumetric content item. At operation 820, the volumetric content presentation system 100 identifies a real-world element in the real-world environment. At operation 822, the volumetric content presentation system 100 associates the volumetric content item with the real-world element. At operation 824, the volumetric content presentation system 100 causes presentation of the volumetric content item based on the association with the real-world element. In an example, the volumetric content item is presented at a predefined distance from the real-world element based on the association. In another example, the volumetric content item is presented as an overlay on the real-world element based on the association. In presenting the volumetric content item, the volumetric content presentation system 100 may perform one or more scaling operations to adjust the dimension of the volumetric content item. The adjustments may be determined automatically based on characteristics of the real-world environment and the volumetric content item or the adjustments may be determined based on user input. As an example, the size of the volumetric content item may be adjusted (scaled) to match the size of the real-world element.

With returned reference to the examples illustrated in FIG. 6 and FIGS. 7A and 7B, the volumetric content presentation system 100 identifies the wall 708 as a real-world element (at operation 820), associates the volumetric content item 612 with the wall 708 (at operation 822), and the volumetric content presentation system 100 causes presentation of the volumetric content item 612 overlaid on the wall 708 (at operation 824).

Figure 9:
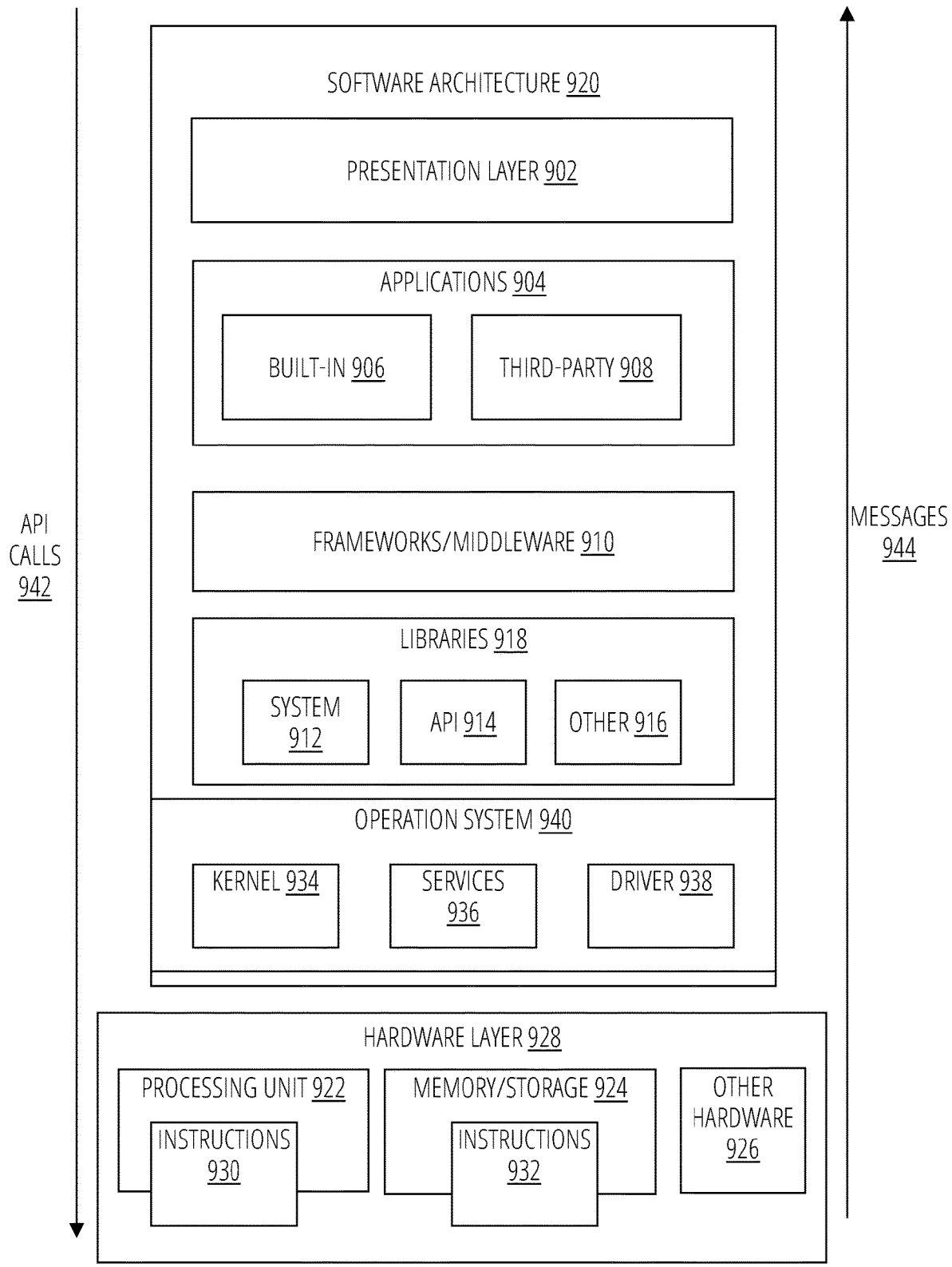
FIG. 9 is a block diagram illustrating a representative software architecture, which may be used in conjunction with various hardware architectures herein described, in accordance with some example embodiments.

FIG. 9 is a block diagram illustrating an example software architecture 920, which may be used in conjunction with various hardware architectures herein described. FIG. 9 is a non-limiting example of a software architecture, and it will be appreciated that many other architectures may be implemented to facilitate the functionality described herein. The software architecture 920 may execute on hardware such as a machine 1000 of FIG. 10 that includes, among other things, processors 1004, memory/storage 1006, and I/O components 1018. A representative hardware layer 928 is illustrated and can represent, for example, the machine 1000 of FIG. 10. The representative hardware layer 928 includes a processing unit 922 having associated executable instructions 930. The executable instructions 930 represent the executable instructions of the software architecture 920, including implementation of the methods, components, and so forth described herein. The hardware layer 928 also includes memory and/or storage modules 924, which also have the executable instructions 932. The hardware layer 928 may also comprise other hardware 926.

In the example architecture of FIG. 9, the software architecture 920 may be conceptualized as a stack of layers where each layer provides particular functionality. For example, the software architecture 920 may include layers such as an operation system 940, libraries 918, frameworks/middleware 910, applications 904, and a presentation layer 902. Operationally, the applications 904 and/or other components within the layers may invoke API calls 942 through the software stack and receive a response to the API calls 942 as messages 944. The layers illustrated are representative in nature and not all software architectures have all layers. For example, some mobile or special-purpose operating systems may not provide a frameworks/middleware 910, while others may provide such a layer. Other software architectures may include additional or different layers.

The operation system 940 may manage hardware resources and provide common services. The operation system 940 may include, for example, a kernel 934, services 936, and drivers 938. The kernel 934 may act as an abstraction layer between the hardware and the other software layers. For example, the kernel 934 may be responsible for memory management, processor management (e.g., scheduling), component management, networking, security settings, and so on. The services 936 may provide other common services for the other software layers. The drivers 938 are responsible for controlling or interfacing with the underlying hardware. For instance, the drivers 938 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 918 provide a common infrastructure that is used by the applications 904 and/or other components and/or layers. The libraries 918 provide functionality that allows other software components to perform tasks in an easier fashion than by interfacing directly with the underlying operation system 940 functionality (e.g., kernel 934, services 936, and/or drivers 938). The libraries 918 may include system libraries 912 (e.g., C standard library) that may provide functions such as memory allocation functions, string manipulation functions, mathematical functions, and the like. In addition, the libraries 918 may include API libraries 914 such as media libraries (e.g., libraries to support presentation and manipulation of various media formats such as MPEG4, H.294, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 918 may also include a wide variety of other libraries 916 to provide many other APIs to the applications 904 and other software components/modules.

The frameworks/middleware 910 provide a higher-level common infrastructure that may be used by the applications 904 and/or other software components/modules. For example, the frameworks/middleware 910 may provide various GUI functions, high-level resource management, high-level location services, and so forth. The frameworks/middleware 910 may provide a broad spectrum of other APIs that may be utilized by the applications 904 and/or other software components/modules, some of which may be specific to a particular operating operation system 940 or platform.

The applications 904 include built-in applications 906 and/or third-party applications 908. Examples of representative built-in applications 906 may include, but are not limited to, a contacts application, a browser application, a book reader application, a location application, a media application, a messaging application, and/or a game application. The third-party applications 908 may include an application developed using the ANDROID™ or IOS™ software development kit (SDK) by an entity other than the vendor of the particular platform and may be mobile software running on a mobile operating system such as IOS™ ANDROID™, WINDOWS® Phone, or other mobile operating systems. The third-party applications 908 may invoke the API calls 942 provided by the mobile operating system (such as the operating operation system 940) to facilitate functionality described herein.

The applications 904 may use built-in operating system functions (e.g., kernel 934, services 936, and/or drivers 938), libraries 918, and frameworks/middleware 910 to create user interfaces to interact with users of the system. Alternatively, or additionally, in some systems interactions with a user may occur through a presentation layer, such as the presentation layer 902. In these systems, the application/component "logic" can be separated from the aspects of the application/component that interact with a user.

Figure 10:
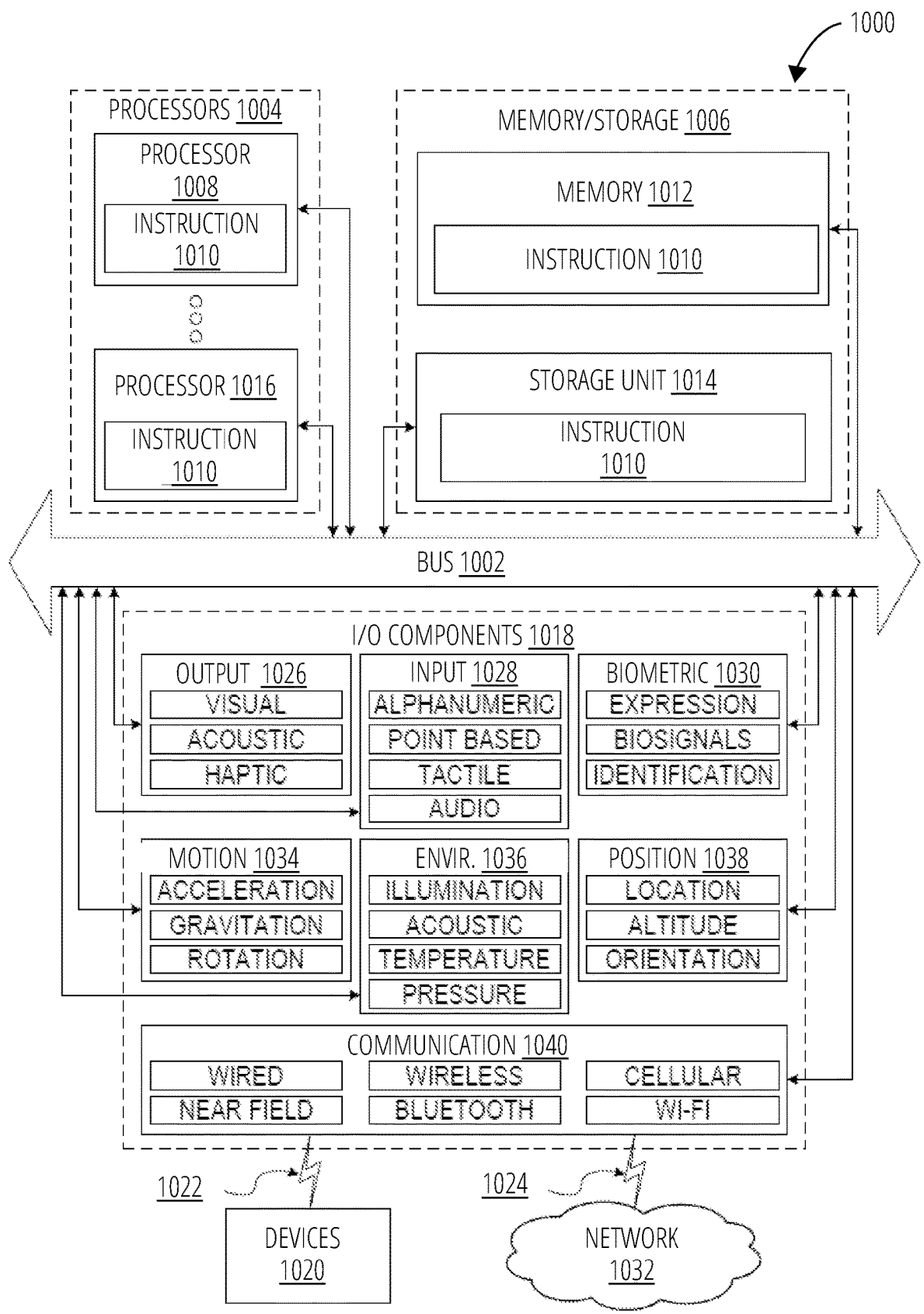
FIG. 10 is a block diagram illustrating components of a machine able to read instructions from a machine-readable medium (e.g., a machine-readable storage medium) and perform any one or more of the methodologies discussed herein, in accordance with some example embodiments.

FIG. 10 is a block diagram illustrating components of a machine 1000, according to some example embodiments, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1010 (e.g., software, a program, an application, an applet, an app, or other executable code) for causing the machine 1000 to perform any one or more of the methodologies discussed herein may be executed. As such, the instructions 1010 may be used to implement modules or components described herein. The instructions 1010 transform the general, non-programmed machine 1000 into a particular machine 1000 programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a PC, a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1010, sequentially or otherwise, that specify actions to be taken by the machine 1000. Further, while only a single machine 1000 is illustrated, the term "machine" shall also be taken to include a collection of machines that individually or jointly execute the method 800 to perform any one or more of the methodologies discussed herein.

The machine 1000 may include processors 1004, memory/storage 1006, and I/O components 1018, which may be configured to communicate with each other such as via a BUS 1002. In an example embodiment, the processors 1004 (e.g., a CPU, a reduced instruction set computing (RISC) processor, a complex instruction set computing (CISC) processor, a (GPU, a digital signal processor (DSP), an ASIC, a radio-frequency integrated circuit (RFIC), another processor, or any suitable combination thereof) may include, for example, a processor 1008 and a processor 1016 that may execute the instructions 1010. Although FIG. 10 shows multiple processors 1004, the machine 1000 may include a single processor with a single core, a single processor with multiple cores (e.g., a multi-core processor), multiple processors with a single core, multiple processors with multiple cores, or any combination thereof.

The memory/storage 1006 may include a memory 1012, such as a main memory, or other memory storage, and a storage unit 1014, both accessible to the processors 1004 such as via the BUS 1002. The storage unit 1014 and memory 1012 store the instructions 1010 embodying any one or more of the methodologies or functions described herein. The instructions 1010 may also reside, completely or partially, within the memory 1012, within the storage unit 1014, within at least one of the processors 1004 (e.g., within the processor's cache memory), or any suitable combination thereof, during execution thereof by the machine 1000. Accordingly, the memory 1012, the storage unit 1014, and the memory of the processors 1004 are examples of machine-readable media.

The I/O components 1018 may include a wide variety of components to receive input, provide output, produce output, transmit information, exchange information, capture measurements, and so on. The specific I/O components 1018 that are included in a particular machine 1000 will depend on the type of machine. For example, portable machines such as mobile phones will likely include a touch input device or other such input mechanisms, while a headless server machine will likely not include such a touch input device. It will be appreciated that the I/O components 1018 may include many other components that are not shown in FIG. 10. The I/O components 1018 are grouped according to functionality merely for simplifying the following discussion, and the grouping is in no way limiting. In various example embodiments, the I/O components 1018 may include output components 1026 and input components 1028. The output components 1026 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input component 1028 may include alphanumeric input components (e.g., a keyboard, a touch screen display configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen display that provides location and/or force of touches or touch gestures, or other tactile input components), audio input components (e.g., a microphone), and the like.

In further example embodiments, the I/O components 1018 may include biometric components 1030, motion components 1034, environment components 1036, or position components 1038, among a wide array of other components. For example, the biometric components 1030 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1034 may include acceleration sensor components (e.g., accelerometer), gravitation sensor components, rotation sensor components (e.g., gyroscope), and so forth. The environment components 836 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position component 1038 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1018 may include communication components 1040 operable to couple the machine 1000 to a network 1032 or devices 1020 via a coupling 1024 and a coupling 1022, respectively. For example, the communication components 1040 may include a network interface component or other suitable device to interface with the network 1032. In further examples, the communication components 1040 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1020 may be another machine or any of a wide variety of peripheral devices (e.g., a peripheral device coupled via a USB).

Moreover, the communication components 1040 may detect identifiers or include components operable to detect identifiers. For example, the communication components 840 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF4114, Ultra Code, UCC RSS-2D bar code, and other optical codes), or acoustic detection components (e.g., microphones to identify tagged audio signals). In addition, a variety of information may be derived via the communication components 1040, such as location via Internet Protocol (IP) geolocation, location via Wi-Fi® signal triangulation, location via detecting an NFC beacon signal that may indicate a particular location, and so forth.

Glossary

"CARRIER SIGNAL" in this context refers to any intangible medium that is capable of storing, encoding, or carrying instructions for execution by a machine, and includes digital or analog communications signals or other intangible media to facilitate communication of such instructions. Instructions may be transmitted or received over a network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, PDA, smart phone, tablet, ultra book, netbook, laptop, multi-processor system, microprocessor-based or programmable consumer electronics system, game console, set-top box, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling to the network may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

"MACHINE-READABLE MEDIUM" in this context refers to a component, device, or other tangible medium able to store instructions and data temporarily or permanently, and may include, but is not limited to, random-access memory (RAM), read-only memory (ROM), buffer memory, flash memory, optical media, magnetic media, cache memory, other types of storage (e.g., Erasable Programmable Read-Only Memory (EPROM)), and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, a physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

A "HARDWARE COMPONENT" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an ASIC. A hardware component may also include programmable logic or circuitry that is temporarily configured by software to perform certain operations. For example, a hardware component may include software executed by a general-purpose processor or other programmable processor.

Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components.

Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application programming interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine. A processor may, for example, be a CPU, a RISC processor, a CISC processor, a GPU, a DSP, an ASIC, a RFIC, or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, (for example, giving date and time of day) sometimes accurate to a small fraction of a second.

What is claimed is:

1. A method, comprising:
identifying a two-dimensional element from one or more two-dimensional images;
generating a volumetric content item based on the two-dimensional element identified from the one or more two-dimensional images, the volumetric content item representing the two-dimensional element;
identifying a real-world element in a real-world environment;
associating the volumetric content item with the real-world element in the real-world environment;
presenting an interactive interface operable to receive an association between the volumetric content item and the real-world element;
receiving an input indicative of the association between the volumetric content item and the real-world element; and
causing presentation, by a display device, of the volumetric content item overlaid on the real-world environment at a location based on the association, the real-world environment being is within a field of view of a user of the display device.

2. The method of claim 1, wherein the interactive interface is a second interactive interface, and the method further comprises:
providing a first interactive interface operable to receive user identification of the two-dimensional element from the one or more two-dimensional images; and
receiving an input indicative of the user identification of the two-dimensional element, wherein the identifying of the two-dimensional element is based on the input.

3. The method of claim 1, wherein the identifying of the two-dimensional element from the one or more two-dimensional images comprises performing image segmentation on the one or more two-dimensional images.

4. The method of claim 1, wherein the causing of presentation of the volumetric content item overlaid on the real-world environment comprises:
causing presentation of one or more virtual objects in conjunction with the volumetric content item.

5. The method of claim 4, wherein the one or more virtual objects comprise one or more computer-generated objects that are imaginary.

6. The method of claim 1, further comprising:
obtaining a metadata associated with the one or more two-dimensional images;
generating a visual effect based on the metadata, the visual effect includes one or more augmentations to be applied to the real-world environment; and
causing presentation, by the display device, of the visual effect applied to the real-world environment.

7. The method of claim 6, wherein the causing of the presentation of the visual effect applied to the real-world environment comprises causing presentation of an animated effect in conjunction with the volumetric content item.

8. The method of claim 1, further comprising:
obtaining a metadata associated with the one or more two-dimensional images;
determining a real-world effect based on the metadata, real-world effect being associated with functionality provided by a network-connected device; and
causing the network-connected device in the real-world environment to provide the real-world effect.

9. The method of claim 1, further comprising:
generating volumetric content based on the presentation of the volumetric content item overlaid on the real-world environment; and
storing the volumetric content for subsequent presentation.

10. The method of claim 1, wherein:
the one or more images depict a first location; and
the method further comprises:
determining a second location associated with the display device;
determining the second location is within a threshold distance of the first location; and
the causing of the presentation of the volumetric content item is in response to determining the second location is within the threshold distance of the first location.

11. A system comprising:
one or more hardware processors; and
at least one memory storing instructions that cause the one or more hardware processors to perform operations comprising:
identifying a two-dimensional element from one or more two-dimensional images;
generating a volumetric content item based on the two-dimensional element identified from the one or more two-dimensional images;
identifying a real-world element in a real-world environment;
associating the volumetric content item with the real-world element in the real-world environment;
presenting an interactive interface operable to receive an association between the volumetric content item and the real-world element;
receiving an input indicative of the association between the volumetric content item and the real-world element; and
causing presentation, by a display device, of the volumetric content item overlaid on the real-world environment at a location based on the association, the real-world environment being within a field of view of a user of the display device.

12. The system of claim 11, wherein the interactive interface is a second interactive interface, and the operations further comprise:
providing a first interactive interface operable to receive user identification of the two-dimensional element from the one or more two-dimensional images; and
receiving an input indicative of the user identification of the two-dimensional element, wherein the identifying of the two-dimensional element is based on the input.

13. The system of claim 11, wherein the identifying of the two-dimensional element from the one or more two-dimensional images comprises performing image segmentation on the one or more two-dimensional images.

14. The system of claim 11, wherein the causing of presentation of the volumetric content item overlaid on the real-world environment comprises:
causing presentation of one or more virtual objects in conjunction with the volumetric content item.

15. The system of claim 14, wherein the one or more virtual objects comprise one or more computer-generated objects that are imaginary.

16. The system of claim 11, wherein the operations further comprising:
obtaining a metadata associated with the one or more two-dimensional images;

generating a visual effect based on the metadata, the visual effect includes one or more augmentations to be applied to the real-world environment; and causing presentation, by the display device, of the visual effect applied to the real-world environment.

17. The system of claim 16, wherein the causing of the presentation of the visual effect applied to the real-world environment comprises causing presentation of an animated effect in conjunction with the volumetric content item.

18. The system of claim 11, wherein the operations further comprising:

obtaining a metadata associated with the one or more two-dimensional images;

determining a real-world effect based on the metadata, the real-world effect being associated with functionality provided by a network-connected device; and causing the network-connected device in the real-world environment to provide the real-world effect.

19. The system of claim 11, wherein the operations further comprising:

generating volumetric content based on the presentation of the volumetric content item overlaid on the real-world environment; and storing the volumetric content for subsequent presentation.

20. A machine-readable medium storing instructions that, when executed by a computer system, cause the computer system to perform operations comprising:

identifying a two-dimensional element from one or more two-dimensional images;

generating a volumetric content item based on the two-dimensional element identified from the one or more two-dimensional images;

identifying a real-world element in a real-world environment;

associating the volumetric content item with the real-world element in the real-world environment;

presenting an interactive interface operable to receive an association between the volumetric content item and the real-world element;

receiving an input indicative of the association between the volumetric content item and the real-world element; and causing presentation, by a display device, of the volumetric content item overlaid on the real-world environment at a location based on the association, the real-world environment being within a field of view of a user of the display device.

* * * * *